United States Patent
Takahashi et al.

(10) Patent No.: US 9,976,874 B2
(45) Date of Patent: May 22, 2018

(54) MAGNETIC ENCODER DEVICE AND ROTATION DETECTION DEVICE

(71) Applicant: NTN CORPORATION, Osaka (JP)

(72) Inventors: Toru Takahashi, Shizuoka (JP); Tatsuo Nakajima, Aichi (JP); Hiroyuki Hakamata, Osaka (JP); Ikuo Uemoto, Aichi (JP); Shinji Miyazaki, Aichi (JP); Takuji Harano, Aichi (JP); Takayuki Oda, Aichi (JP)

(73) Assignee: NTN CORPORATION, Osaka (JP)

( * ) Notice: Subject to any disclaimer, the term of this patent is extended or adjusted under 35 U.S.C. 154(b) by 61 days.

(21) Appl. No.: 14/904,223

(22) PCT Filed: Jul. 2, 2014

(86) PCT No.: PCT/JP2014/067629
§ 371 (c)(1),
(2) Date: Jan. 11, 2016

(87) PCT Pub. No.: WO2015/008622
PCT Pub. Date: Jan. 22, 2015

(65) Prior Publication Data
US 2016/0146630 A1  May 26, 2016

(30) Foreign Application Priority Data

Jul. 16, 2013 (JP) .................................. 2013-147638
Oct. 11, 2013 (JP) .................................. 2013-213813
(Continued)

(51) Int. Cl.
*G01D 5/14* (2006.01)
*G01D 5/244* (2006.01)
(Continued)

(52) U.S. Cl.
CPC ................ *G01D 5/14* (2013.01); *G01D 5/246* (2013.01); *G01D 5/2452* (2013.01); *G01D 5/24438* (2013.01)

(58) Field of Classification Search
USPC ........................................ 324/207.11, 207.25
See application file for complete search history.

(56) References Cited

U.S. PATENT DOCUMENTS

2005/0073444 A1  4/2005 Shiotsuka et al.
2006/0208173 A1*  9/2006 Nakamura .............. G01P 3/486
250/231.13
(Continued)

FOREIGN PATENT DOCUMENTS

CN   102472607   5/2012
EP   2 450 661   5/2012
(Continued)

OTHER PUBLICATIONS

Extended European Search Report dated Mar. 28, 2017 in corresponding European Application No. 14825711.6.
(Continued)

*Primary Examiner* — Vincent Q Nguyen
(74) *Attorney, Agent, or Firm* — Wenderoth, Lind & Ponack, L.L.P.

(57) ABSTRACT

A magnetic encoder device (3) of the present invention includes a base portion (33) having a mounting surface (33*b*) for mounting to a rotary shaft (2), a cored bar (35) fitted and fixed over the base portion (33), and a double-row magnetic encoder track (30) formed on the cored bar (35). Through movement of each of magnetic poles of the magnetic encoder track (30) over a region opposed to a magnetic sensor (4), an angle of the rotating rotary shaft is detected. The base portion (33) is formed of a sintered metal, and the mounting surface (33*b*) is subjected to sizing.

18 Claims, 26 Drawing Sheets

(30) Foreign Application Priority Data

| Oct. 11, 2013 | (JP) | ................................ | 2013-213815 |
| Oct. 16, 2013 | (JP) | ................................ | 2013-215703 |
| Oct. 16, 2013 | (JP) | ................................ | 2013-215758 |
| Oct. 16, 2013 | (JP) | ................................ | 2013-215760 |

(51) Int. Cl.
*G01D 5/245* (2006.01)
*G01D 5/246* (2006.01)

(56) References Cited

U.S. PATENT DOCUMENTS

| 2007/0268013 A1* | 11/2007 | Yamamoto | F16C 33/723 |
| | | | 324/174 |
| 2008/0297143 A1 | 12/2008 | Tanaka et al. | |
| 2010/0225309 A1 | 9/2010 | Takahashi et al. | |
| 2011/0025312 A1* | 2/2011 | Nagano | G01D 5/2497 |
| | | | 324/207.25 |
| 2012/0105055 A1 | 5/2012 | Takahashi et al. | |

FOREIGN PATENT DOCUMENTS

| JP | 63-115008 | 5/1988 |
| JP | 8-184603 | 7/1996 |
| JP | 2005-114507 | 4/2005 |
| JP | 2005-214874 | 8/2005 |
| JP | 2007-33455 | 2/2007 |
| JP | 2008-215921 | 9/2008 |
| JP | 2009-80058 | 4/2009 |
| JP | 2010-24495 | 2/2010 |
| JP | 2010-249536 | 11/2010 |
| JP | 2011-27719 | 2/2011 |

OTHER PUBLICATIONS

International Preliminary Report on Patentability and Written Opinion of the International Searching Authority dated Jan. 19, 2016 in International (PCT) Application No. PCT/JP2014/067629.

Chinese Office Action with English translation of Chinese Search Report dated Feb. 23, 2017 in corresponding Chinese Application No. 201480040143.3.

International Search Report dated Sep. 16, 2014 in International (PCT) Application No. PCT/JP2014/067629.

Notice of reasons for refusal dated Sep. 28, 2017 in corresponding Japanese Application No. 2013-213813, with English translation.

* cited by examiner

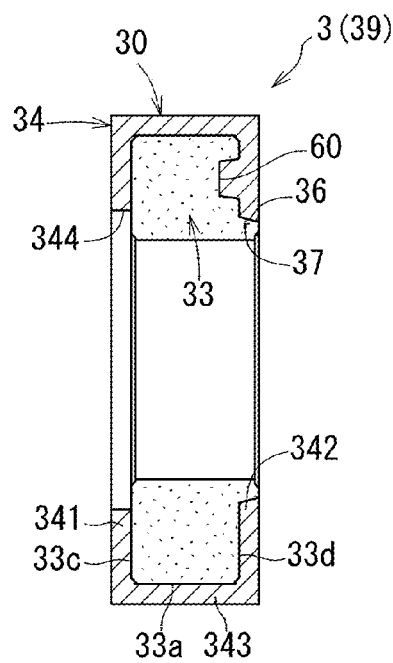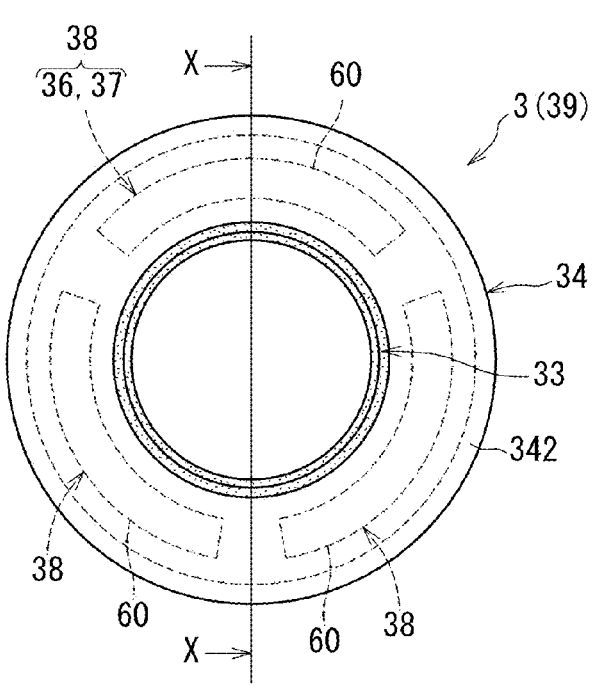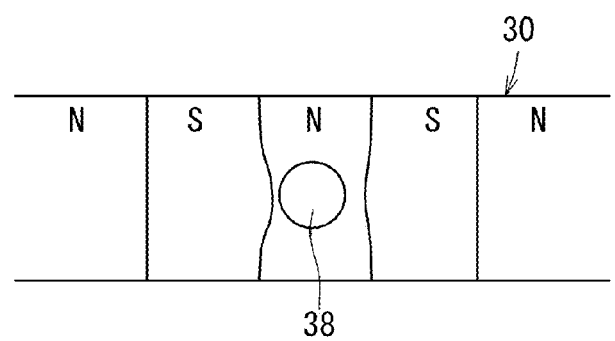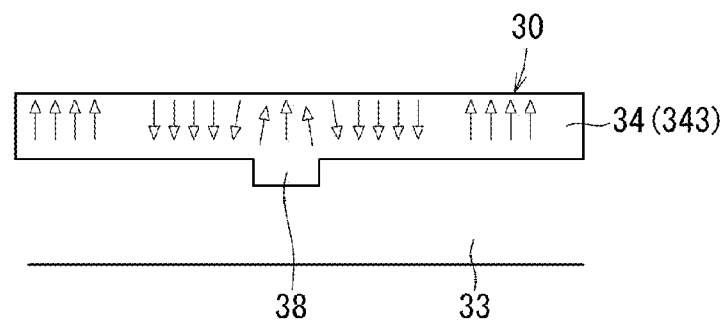

|  | AFTER STEAMING TREATMENT | | | UNTREATED |
|---|---|---|---|---|
|  | 530°C/25min | 550°C/25min | 570°C/25min | (AFTER SINTERING) |
| EVALUATION | △ | ○ | ○ | ¶ |

| | REDUCED IRON POWDER | | | ATOMIZED IRON POWDER |
|---|---|---|---|---|
| | −63 μm | +63 ~ −75 μm | +75 ~ −106 μm | +63 ~ −75 μm |
| SURFACE ROUGHNESS Ra (AFTER SINTERING) | 3.2a ~ 6.3a | 6.3a ~ 12.5a | 6.3a ~ 12.5a | 6.3a ~ 12.5a |
| ADHESION FORCE: RELATIVE NUMERICAL VALUE REGARDING PRODUCT FORMED OF REDUCED IRON POWDER OF FROM +63 μm to −75 μm AS 100 | 81 | 100 | 113 | 88 |
| EVALUATION | ¶ | ○ | ◎ | △ |

MAGNETIC ENCODER DEVICE AND ROTATION DETECTION DEVICE

TECHNICAL FIELD

The present invention relates to a magnetic encoder device and a rotation detection device including the magnetic encoder device.

BACKGROUND ART

A magnetic encoder device has a configuration in which a multipolar magnet opposed to a magnetic sensor is rotated to detect passage of each of magnetic poles N and S of the multipolar magnet by the magnetic sensor, to thereby detect rotation of a rotary member. As this type of magnetic encoder device, there is publicly known the one that is incorporated into a bearing device for a wheel of an automobile and is used to detect the number of rotations of the wheel for an antilock brake system (ABS), as disclosed in, for example, JP 2010-249536 A (Patent Literature 1). In the magnetic encoder device, the multipolar magnet opposed to the magnetic sensor is formed by injection molding of a magnet material containing a magnetic powder and a thermoplastic resin.

On the other hand, as disclosed in, for example, JP 2009-80058 A (Patent Literature 2), there is known, as the magnetic encoder device, the one in which magnetic encoder tracks are arranged in a double row so that an absolute angle (rotation phase) of a rotary shaft can be detected based on a phase difference between magnetic signals detected in different tracks.

CITATION LIST

Patent Literature 1: JP 2010-249536 A
Patent Literature 2: JP 2009-80058 A

SUMMARY OF INVENTION

Technical Problem

In the case of the rotation detection device configured to detect the number of rotations as described in Patent Literature 1, a required resolution is not so high. Therefore, as far as detection accuracy is concerned, conventionally used product accuracy does not provide any inconvenience in practical use. On the other hand, the rotation detection device configured to detect the absolute angle of the rotary shaft as described in Patent Literature 2 requires remarkably high resolution and accuracy as compared with the case where the number of rotations is simply detected. Therefore, high accuracy is required for the magnetic encoder tracks. In particular, through investigation by the inventors of the present invention, it is found that slight whirling of the magnetic encoder device significantly affects the detection accuracy for the absolute angle. The magnetic encoder track is generally formed on a ring-shaped member. When such a member is formed by machining such as cutting to satisfy the required accuracy high enough to prevent the whirling, there arises a problem in that processing costs rise significantly.

Further, when the multipolar magnet made of the resin and the magnetic powder as described in Patent Literature 1 is used for the detection of the angle of the rotary shaft as described above, the multipolar magnet is peeled from a member serving as a base therefor (in general, formed of a material different from those of the multipolar magnet) or a crack is generated in the multipolar magnet in some cases when the rotation detection device is exposed to a significant temperature change. There is a fear in that the multipolar magnet and the member serving as the base do not rotate in synchronization to cause an infinitesimal phase shift therebetween due to the peeling or the crack, thereby significantly lowering the detection accuracy for the absolute angle.

Further, the magnetic encoder device generally has a configuration in which a magnetic body (back yoke) is arranged behind the magnetic encoder track. In this case, when there is a variation in distance between the magnetic sensor and the magnetic body within a sensing region of the magnetic sensor, a magnetic force generated in the magnetic encoder tracks becomes non-uniform to adversely affect the detection accuracy for the absolute angle. A thickness-reduced portion such as a chamfer is formed at a corner portion of the magnetic body in accordance with general practices for mechanical components. The thickness-reduced portion becomes a factor of causing the above-mentioned variation in distance, and is therefore required to be arranged out of the sensing region of the magnetic sensor. Thus, the magnetic encoder device is increased in size, which causes reduction in degree of freedom in design.

Therefore, the present invention has a main object to provide a magnetic encoder device capable of suppressing whirling of a magnetic encoder track at low costs, and to provide a rotation detection device comprising the magnetic encoder device.

Further, the present invention has a second object to prevent reduction in detection accuracy for detection of an angle of a rotary shaft under an environment where a temperature change is significant, and a third object to suppress increase of the magnetic encoder device in size and reduction in degree of freedom in design due to a thickness-reduced portion formed on a base portion.

Solution to Problem

In order to achieve the above-mentioned objects, according to one embodiment of the present invention, there is provided a magnetic encoder device, comprising: a rotary member having a mounting surface for mounting the rotary member to a rotary shaft; and a magnetic encoder track formed on the rotary member, the magnetic encoder track comprising a plurality of magnetic poles arranged in a circumferential direction of the rotary member, each of the plurality of magnetic poles of the magnetic encoder track being moved in a region opposed to a magnetic sensor to detect an angle of the rotating rotary shaft, wherein: a region including the mounting surface of the rotary member is formed of a sintered metal; and at least the mounting surface is subjected to sizing.

The region including the mounting surface of the rotary member is formed of the sintered metal, and the mounting surface is a sized surface (no mechanical processing mark such as cutting mark or polishing mark is left on the surface that is finished with the sizing). As a result, surface accuracy such as flatness and cylindricity of the mounting surface can be enhanced at low costs. Therefore, even when the rotary shaft is mounted on the mounting surface, the magnetic encoder device can be rotated with highly accurate coaxiality with a center of rotation of the rotary shaft. Therefore, whirling of the magnetic encoder track can be suppressed. In the configuration described above, a first track and a second track, each comprising magnetic poles, are comprised in the magnetic encoder track. As a result, an angle (for example, an absolute angle) of the rotary shaft can be detected with high accuracy by using the Vernier principle.

It is preferred that the rotary member have a surface to be positioned at time of formation of the magnetic encoder track through magnetization, that a region including the surface to be positioned be formed of a sintered metal, and that the surface to be positioned be subjected to the sizing. In this manner, the magnetization can be performed with high accuracy.

For example, the rotary member comprises: a base portion made of a sintered metal, having the mounting surface for mounting the rotary member to the rotary shaft; and a supporting member fitted and fixed over the base portion; and the magnetic encoder track is formed on the supporting member. With the configuration described above, the degree of freedom in position of arrangement of the magnetic encoder device can be increased. In this case, it is preferred to perform the magnetization for forming the magnetic encoder track under a state in which the supporting member is fixed to the base portion. For the assembly of the supporting member to the base portion, infinitesimal deformation of the supporting member is inevitable. However, when the magnetization is performed after the assembly of the supporting member, the magnetization is performed based on the supporting member after the occurrence of the infinitesimal deformation as a reference. Therefore, reduction in accuracy of the magnetic encoder track along with the infinitesimal deformation of the supporting member can be avoided.

Further, the rotary member may comprise the base portion made of a sintered metal, having the mounting surface for mounting the rotary member to the rotary shaft. With the configuration described above, cost reduction and enhancement of the magnetization accuracy can be achieved by reduction of the number of components. In this case, it is preferred to form a molded portion by injection molding with insertion of the base portion, and to form the magnetic encoder track by magnetizing the molded portion. As an injection-molding material of the molded portion, a material containing a thermoplastic resin and a magnetic powder as main components may be used.

In any of the configurations described above, it is preferred that the base portion comprise a first engagement portion, that the molded portion comprise a second engagement portion configured to be engaged with the first engagement portion in the circumferential direction of the rotary member, and that the first engagement portion and the second engagement portion construct a rotation stopper.

With the configuration described above, the first engagement portion of the base portion and the second engagement portion of the molded portion are engaged with each other in the circumferential direction to function as the rotation stopper. Therefore, even when a part of the molded portion is, for example, peeled from the base portion due to a change in temperature, an infinitesimal phase shift between the base portion and the molded portion can be prevented. Therefore, the angle of the rotary member can be detected with high accuracy.

By molding the second engagement portion of the molded portion by using the first engagement portion of the base portion as a molding die, the first engagement portion and the second engagement portion can be brought into close contact with each other without any clearance. Therefore, the infinitesimal phase shift between the base portion and the molded portion can be more reliably prevented.

When the rotation stopper is arranged so as to be opposed to the magnetic sensor, a disturbance occurs in magnetic field and magnetic field lines in the vicinity of the rotation stopper, leading to reduction in the detection accuracy. On the other hand, by arranging the rotation stopper in a region that is not opposed to the magnetic sensor, the above-mentioned problem can be avoided.

Further, by providing the rotation stopper on a downstream side in a direction in which the injection-molding material flows during the injection molding of the molded portion, in particular, on a downstream side of the magnetic encoder track in the flowing direction, reduction in magnetization accuracy of the magnetic encoder track in the periphery of the rotation stopper due to a disturbance of the flow of the injection-molding material can be avoided to enable the enhancement of the detection accuracy.

It is preferred to form the base portion to have a cylindrical shape, to provide, to the molded portion, a first plate portion that covers an end surface of the base portion on one axial side, a second plate portion that covers an end surface of the base portion on another axial side, and a cylindrical portion that covers an outer peripheral surface of the base portion, and to form the molded portion in a continuous manner from the first plate portion through the cylindrical portion to the second plate portion.

It is preferred to provide a gate in an injection-molding step on an inner peripheral surface of the first plate portion. In this case, a gate mark is formed on the inner peripheral surface of the first plate portion of a molded product after mold release. At this time, the first plate portion corresponds to an upstream side in the direction in which the injection-molding material flows, whereas the second plate portion corresponds to the downstream side in the direction in which the injection-molding material flows. When a disc gate is used as the gate, the generation of a weldline or the like on the molded portion can be prevented. In this case, the gate mark is formed over the entire inner peripheral surface of the first plate portion.

In any of the configurations described above, it is preferred that the base portion be formed of a sintered metal containing iron, and that an oxide film be formed at least on a contact region of a surface of the base portion with the molded portion.

In general, when a green compact containing the iron powder is sintered, a surface of the iron powder is to have a shape closer to a spherical form due to self-diffusion. Therefore, iron particles after the sintering have relatively smooth surfaces with elimination of microasperity. On the other hand, through the formation of the oxide film on the surface of the base portion, the microasperity is formed on the surface of the oxide film to increase a specific surface area. In addition, an intermolecular force acts between the oxide film and the injection-molding material. Therefore, a high adhesion force is obtained between the base portion and the molded portion. As a result, peeling of and a crack in the molded portion can be prevented even under conditions of use where a significant temperature change is anticipated. Therefore, the infinitesimal phase difference between the base portion and the molded portion can be prevented to enable the enhancement of the detection accuracy for the angle (for example, the absolute angle) of the rotary member under the conditions described above.

Further, the oxide film has a property of hardening a surface of a sintered structure. Therefore, by forming the oxide film on the mounting surface of the base portion, the mounting surface can be hardened to suppress fretting wear. Further, the oxide film has an insulating property. Thus, metal corrosion due to the formation of a local cell between the rotary shaft and the base portion can be suppressed. Thus, the degree of freedom in selection of the material of the rotary shaft can be enhanced.

In any of the configurations described above, it is preferred to form the base portion by molding and sintering a base powder, and to set a mean particle diameter of the base powder to from 60 µm to 100 µm.

When the base portion is formed of the sintered metal using the iron powder having the mean particle diameter of from 60 µm to 100 µm, the sintered structure is formed of rough particles. Therefore, a surface roughness of the sintered structure becomes larger. Further, a large number of pores formed between the iron particles after the sintering have a sufficiently large size. As a result, the specific surface area of the base portion increases to enhance an anchor effect obtained by the injection-molding material that enters micro-concave portions and the pores on the surface of the sintered structure. Therefore, a high adhesion force can be obtained between the base portion and the molded portion. Hence, the peeling of and the crack in the molded portion can be prevented even under the conditions of use where a significant temperature change is anticipated. In this manner, the infinitesimal phase shift between the base portion and the molded portion can be prevented to enable the enhancement of the detection accuracy for the angle (for example, the absolute angle) of the rotary member.

When the mean particle diameter of the iron powder is smaller than 60 µm, the surface of the sintered structure is smoothened to reduce the specific surface area. Therefore, the adhesion force between the base portion and the molded portion becomes insufficient. On the other hand, when the mean particle diameter of the iron powder is larger than 100 µm, contact portions between the particles are reduced to lower a mechanical strength of the base portion. Further, due to increase in surface roughness Ra, there arises a problem of reduction in surface accuracy such as the flatness or the cylindricity of the mounting surface after the sizing.

In this case, it is preferred that the base powder contain iron powder as a main component. When the iron powder contains reduced iron powder as a main component, the specific surface area of the base portion can be further increased. As a result, the adhesion force between the base portion and the molded portion can be further enhanced.

In any of the configurations described above, it is preferred that a rough surface portion having a larger surface roughness than a surface roughness of the mounting surface be formed on a contact region of a surface of the base portion with the molded portion.

By forming the rough surface portion as described above, the injection-molding material of the molded portion deeply enters the micro-concave portions of the rough surface portion to produce the anchor effect. Therefore, a high adhesion force can be obtained between the base portion and the molded portion. Hence, the peeling of and the crack in the molded portion can be prevented even under the conditions of use where a significant temperature change is anticipated so that the infinitesimal phase shift between the base portion and the molded portion can be prevented. Therefore, the angle (for example, the absolute angle) of the rotary member can be detected with high accuracy over a wide temperature range.

It is preferred that the rough surface portion be formed at least on the surface of the base portion, which is opposed to the magnetic encoder track. The surface of the base portion, which is opposed to the magnetic encoder track, has a large area based on general practices. Therefore, by adopting the configuration described above, the adhesion force between the molded portion and the base portion can be effectively increased.

When not only the mounting surface but also the rough surface portion is finished with the sizing, a difference can be provided in surface roughness between the rough surface portion and the mounting surface only by setting sizing allowances for the rough surface portion and the mounting surface different from each other. In order to set a magnitude relationship in the surface roughness between the rough surface portion and the mounting surface to the above-mentioned one, it is necessary to set the sizing allowance for the mounting surface larger than the sizing allowance for the rough surface portion. In this case, compressibility of the mounting surface becomes larger than that of the rough surface portion. Therefore, the mounting surface is formed as a hard surface with high accuracy. Therefore, mounting accuracy of the magnetic encoder device to the rotary member can be further increased. Further, positioning accuracy of the base portion during the injection molding can also be increased to enhance the molding accuracy of the molded portion, thereby enabling the enhancement of the magnetization accuracy of the magnetic encoder track.

When the rough surface portion and the mounting surface are finished with the sizing as described above, it is preferred to set the surface roughness of the mounting surface within a range of from 10% to 50% of the surface roughness of the rough surface portion. As specific numerical examples, the surface roughness of the mounting surface of from 3.2 µm Ra or smaller and the surface roughness of the rough surface portion within a range of from 6.3 µm Ra to 12.5 µm Ra are given.

In any of the configurations described above, it is preferred that any one of an outer peripheral surface and an end surface of the base portion be opposed to the magnetic sensor, that a thickness-reduced portion be formed between the outer peripheral surface and the end surface of the base portion, and that an angle θ of inclination formed by a line connecting a first boundary portion corresponding to a boundary between the thickness-reduced portion and the outer peripheral surface and a second boundary portion corresponding to a boundary between the thickness-reduced portion and the end surface with respect to a sensing direction of the magnetic sensor be set to satisfy θ<45°.

In order to uniformize a magnetic force generated in the magnetic encoder track after the magnetization, it is necessary to set a distance from the magnetic sensor to the surface of the magnetic body constant in the sensing region of the magnetic sensor. The region of a magnetized surface of the molded portion, in which the distance becomes constant, becomes an effective width for the magnetization. When any one of the outer peripheral surface and the end surface of the base portion is opposed to the magnetic sensor, the thickness-reduced portion is formed between the outer peripheral surface and the end surface of the base portion, and the angle of inclination of the thickness-reduced portion with respect to the sensing direction of the magnetic sensor is set to satisfy θ<45°, the effective width of the magnetized surface can be set larger than an effective width of an existing product. Therefore, the magnetic force of the magnetic encoder track can be enhanced without increasing the dimensions of the magnetic encoder device. As a result, the magnetization accuracy is enhanced. Further, an allowance can be provided to a distance between the detection elements of the magnetic sensor. As a result, the degree of freedom in selection of the magnetic sensor is enhanced. In addition, the magnetic encoder device can be reduced in weight to enable reduction of an inertial moment during the rotation, thereby enabling further enhancement of the detection accuracy.

The thickness-reduced portion may comprise a chamfer, or the thickness-reduced portion may comprise a chamfer and a flat surface adjacent to the chamfer.

With the rotation detection device comprising the above-mentioned magnetic encoder device, the rotary shaft to which the base portion is mounted, and the magnetic sensor opposed to the magnetic encoder track, the angle of the rotary shaft can be detected with high accuracy even under a situation where a significant temperature change is anticipated.

In the rotation detection device, the thickness-reduced portion of the magnetic encoder device is located out of the sensing region of the magnetic sensor. As a result, a thickness of the molded portion can be kept uniform in the sensing region of the magnetic sensor. The magnetic force generated in the magnetic encoder track can be uniformized to enable the enhancement of the detection accuracy of the magnetic sensor.

Advantageous Effects of Invention

According to the one embodiment of the present invention, the whirling of the magnetic encoder track can be prevented, and hence the absolute angle of the rotary shaft can be detected with high accuracy.

By adopting any one of or a combination of two or more of the methods involving the provision of the rotation stopper, the formation of the oxide film, the determination of the range of the mean particle diameter, and the provision of the rough surface portion, the peeling of or the crack in the molded portion can be kept less liable to occur. Therefore, even in a case where the temperature change is significant, the phase shift between the base portion and the molded portion can be prevented. Even under the environment where a significant temperature change is anticipated, the angle of the rotary member can be detected with high accuracy.

Further, when the angle θ of inclination is set to satisfy θ<45°, the effective width of the magnetized surface can be increased. Therefore, the magnetic encoder device can be compactified to further enable the enhancement of the degree of freedom in design.

BRIEF DESCRIPTION OF DRAWINGS

FIG. 26a is a sectional view of a magnetic encoder device.

FIG. 26b is a front view of the magnetic encoder device when viewed from a second plate portion side.

FIG. 27a is a plan view when a rotation stopper is formed in a region opposed to a magnetic sensor.

FIG. 27b is a sectional view when the rotation stopper is formed in the region opposed to the magnetic sensor.

DESCRIPTION OF EMBODIMENTS

Now, embodiments of the present invention are described with reference to the accompanying drawings.

Figure 1:
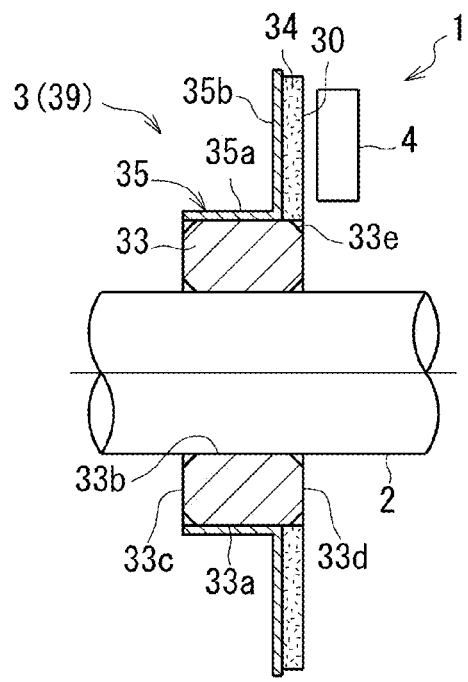
FIG. 1 is a sectional view of an axial-gap type rotation detection device.

FIG. 1 is a sectional view of a schematic configuration of a rotation detection device 1 of an embodiment of the present invention. As illustrated in FIG. 1, the rotation detection device 1 comprises a rotary shaft 2, a magnetic encoder device 3 mounted to the rotary shaft 2, and a magnetic sensor 4 mounted to a stationary member such as a housing. The rotary shaft 2 is rotationally driven by a rotary driving source such as a motor (not shown; for example, a servo motor).

The magnetic encoder device 3 comprises a magnetic encoder track 30 comprising different magnetic poles (N-poles and S-poles) arranged alternately in a circumferential direction. The magnetic encoder track 30 is made of, for example, a rubber, a resin, or a sintered compact containing a magnetic powder, which respectively form a rubber magnet, a plastic magnet, or a sintered magnet through magnetization. In this embodiment, a molded portion 34 made of a resin is magnetized to form the magnetic encoder track 30.

The molded portion 34 is formed of a resin material containing a magnetic powder (ferromagnetic body) and a thermoplastic resin as main components. For example, known magnetic powders comprising not only ferrite-based magnetic powders as typified by, for example, strontium ferrite and barium ferrite but also rare earth-based magnetic powders as typified by, for example, neodymium-iron-boron, samarium-cobalt, and samarium-iron-nitrogen can be used as the magnetic powder. The above-mentioned magnetic powders are used solely or in combination. In this embodiment, the ferrite-based magnetic powder that exhibits superiority in terms of costs and weather resistance is mainly used. When the ferrite-based magnetic powder is used, a rare earth element such as lanthanum or cobalt can also be mixed so as to enhance magnetic characteristics of ferrite.

As the thermoplastic resin, a polyamide-based resin material, for example, PA12 can be used. In order to obtain a high magnetic force in the molded portion 34 having a small thickness (about 0.5 mm) as in the case of this embodiment, it is necessary to fill the magnetic powder at a high density. The polyamide-based material can also meet such a requirement because of its excellent fluidity. Further, when the magnetic encoder device 3 of this embodiment is used for, for example, a bearing for a wheel of an automobile, a weather resistance, a chemical resistance, and the like are required to be satisfied over a wide temperature range. The polyamide-based material can satisfy the above-mentioned characteristics even within a required temperature range (−40° C. to +120° C.). Besides PA12, PA6, PA66, PA612, and the like can also be used as the polyamide-based material. In particular, because of the lowest water absorption property among the above-mentioned materials, PA12 is most preferable to prevent a reduction in magnetic characteristics due to water absorbance.

The magnetic encoder track 30 is capable of detecting an absolute angle based on the Vernier principle, and has a form in which a first track 31 and a second track 32 are coaxially arranged in a double row in an annular fashion.

Magnetic-pole pairs 31a and 32a, each comprising the N-pole and the S-pole, are arranged respectively on the first track 31 and the second track 32 to be magnetized so that the different magnetic poles are arranged alternately in the circumferential direction. In this embodiment, the magnetic poles of the first track 31 are arranged at equal pitches $\lambda 1$, whereas the magnetic poles of the second track 32 are arranged at equal pitches $\lambda 2$ (in the embodiment illustrated in FIG. 2, $\lambda 1 > \lambda 2$). The number of (for example, 32) magnetic-pole pairs 31a in the first track 31 is different from that (for example, 31) of magnetic-pole pairs 32a in the second track 32. For example, when the number of magnetic-pole pairs 31a in the first track 31 is set to an arbitrary number n, the number of magnetic-pole pairs 32a expressed by n±1 can be provided in the second track 32. In this manner, one revolution of the rotary shaft 2 can be detected as an absolute angle within a range of from 0° to 360°. When the range of the detectable absolute angle is set to 180° instead of 360°, the number of magnetic-pole pairs 32a expressed by n±2 only needs to be provided in the second track 32. In this case, the detection within the range of from 0° to 180° is repeated twice for one revolution of the rotary shaft 2 (so-called "2× mode"). Similarly, when n±3 is set, the range of detection of the absolute angle is 120°. The detection is repeated three times for one revolution of the rotary shaft 2 (so-called "3× mode").

The magnetic sensor 4 comprises detection elements 4a respectively opposed to the first track 31 and the second track 32. The detection elements 4a are, for example, two magnetic detection elements separated at a predetermined distance away from each other in a direction of a track pitch, and are respectively opposed to the first track 31 and the second track 32 through an axial gap of about 0.3 mm to about 4 mm in an axial direction therebetween. By rotating the magnetic encoder track 30, the magnetic poles of the respective tracks 31 and 32 move over a region opposed to the detection elements 4a. Therefore, comparing output waveforms of the two detection elements 4a to obtain a phase difference therebetween, an absolute angle of the magnetic encoder track 30 can be detected.

In this embodiment, the magnetic encoder device 3 is formed from a rotary member 39 comprising a base portion 33 and a cored bar 35 as a supporting member. In the embodiment illustrated in FIG. 1 and FIG. 2, the magnetic encoder track 30 is formed on a surface of the cored bar 35.

The cored bar 35 has an L-like cross section with a cylindrical portion 35a and a flange portion 35b extending from one axial end of the cylindrical portion 35a in the radial direction, and is integrally formed of a metal plate of a magnetic body (in particular, a ferromagnetic body), for example, a steel plate of a ferrite-based stainless steel. The cored bar 35 can also be formed of a non-magnetic metal plate although an operating condition of the magnet becomes slightly severe. In this embodiment, the magnetic encoder track 30 is formed on an end surface of the flange portion 35b, which is opposed to the magnetic sensor 4 through the axial gap therebetween. The cylindrical portion 35a of the cored bar 35 is fixed to an outer peripheral surface of the base portion 33 having the cylindrical shape described later by a method such as bonding, press-fitting, or press-fit bonding.

The base portion 33 is made of a sintered metal having a large number of micropores. The base portion 33 is manufactured through steps involving compression molding of a metal powder, sintering, and sizing, which are regularly used as a method of manufacturing the sintered metal. The sintered compact is not impregnated with a lubricating oil. It is preferred that the base portion 33 be made of a magnetic body. Therefore, it is preferred to set an iron content as large as possible. In this embodiment, an iron-based sintered metal (for example, Fe: 100 wt %) containing iron powder as a main component is used. Besides, a copper-based sintered metal containing copper powder as a main component or a copper-iron-based metal containing the copper powder and the iron powder as main components can also be used as the sintered metal.

Figure 3:
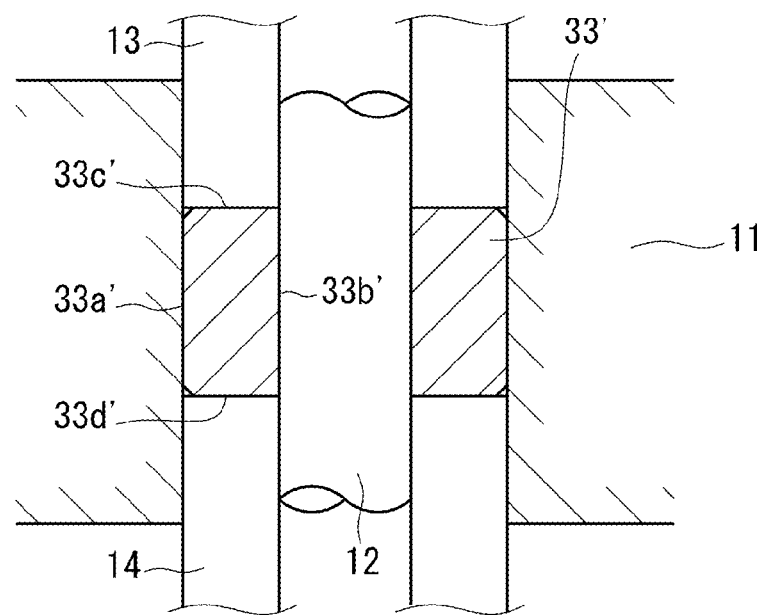
FIG. 3 is a sectional view for illustrating a sizing step.

The sizing is a step of press-fitting a sintered material 33', which is sintered, into a die 11 while fastening both axial end surfaces 33c' and 33d' with punches 13 and 14 or pressurizing the both axial end surfaces 33c' and 33d' of the sintered material 33' with the punches 13 and 14 after accommodation of the sintered material 33' in the die 11 to compress the sintered metal material 33', as illustrated in FIG. 3. During the sizing, a core rod 12 is inserted into an inner periphery of the sintered metal material 33'.

Through the sizing, an outer peripheral surface 33a', an inner peripheral surface 33b', and the both end surfaces 33c' and 33d' of the sintered material 33' are respectively pressed against an inner peripheral surface of the die 11, an outer peripheral surface of the core rod 12, and end surfaces of the punches 13 and 14 to be corrected through plastic deformation, thereby finishing each of the surfaces with high accuracy. Thereafter, the sintered metal material 33' is removed from the die 11 to complete the base portion 33. An outer peripheral surface 33a, an inner peripheral surface 33b, and end surfaces 33c and 33d of the base portion 33 are all sized surfaces. Surface pores are crushed along with the sizing. Therefore, a surface porosity of each of the surfaces 33a to 33d becomes smaller than an internal porosity after the sizing. Radially inner corner portions and radially outer corner portions on both axial ends of the base portion 33e are formed as chamfers 33e. The chamfers 33 are not sized. Therefore, the surface porosity of each of the surfaces 33a to 33d described above becomes smaller than a surface porosity of each of the chamfers 33e.

The cored bar 35 is manufactured by press working or the like. After the manufacture of the cored bar 35, the cored bar 35 is inserted into a die to form the molded portion 34 on an end surface of the flange portion 35b by injection molding. Further, the cylindrical portion 35a of the cored bar 35 is fixed onto an outer peripheral surface of the base portion 33 by a method such as press-fitting. In this manner, the rotary member 39 comprising the base portion 33 and the cored bar 35 integrally formed with the molded portion 34 is manufactured. At this time, a free end of the cylindrical portion 35a of the cored bar 35 is arranged on the same plane as the end surface 33c of the base portion 33, which is located on an opposite side to the magnetic sensor 4 (in a direction away from the magnetic sensor 4), or closer to the magnetic sensor than the end surface 33c. The rotary member 39 can also be manufactured in a procedure in reverse order to that described above. Specifically, the molded portion 34 can be formed by a method such as injection molding on the end surface of the flange portion 35b after fixing the cored bar 35 onto the outer peripheral surface of the base portion 33 by a method such as press-fitting.

Figure 4:
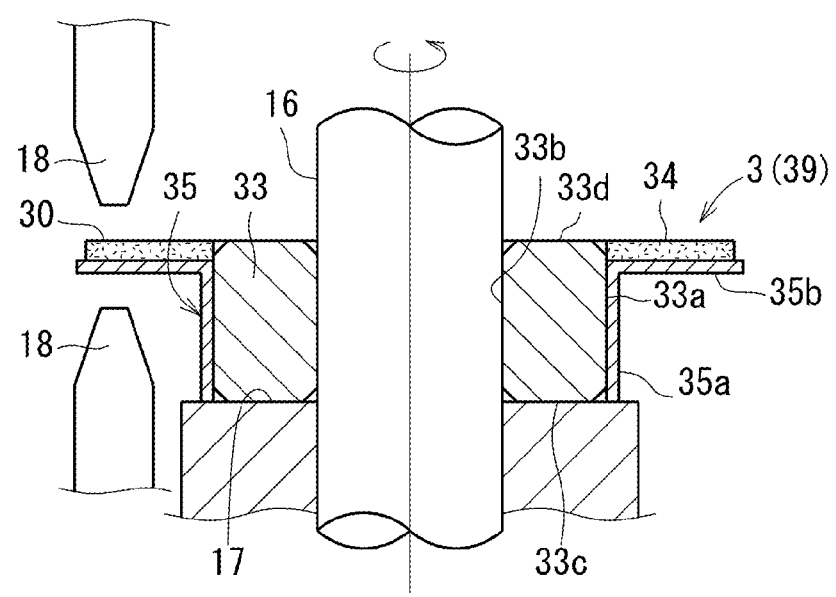
FIG. 4 is a sectional view for illustrating a magnetizing step.

Thereafter, the molded portion 34 is magnetized to form the magnetic encoder track 30. During the magnetization, the inner peripheral surface 33b of the base portion 33 is fitted over a spindle 16 as illustrated in FIG. 4, whereas the base portion 33 is pressed against one axial side (direction away from the magnetic sensor 4) by a chuck mechanism (not shown). As a result, the end surface 33c of the base portion 33, which is on the opposite side to the magnetic sensor 4, and further the free end of the cylindrical portion 35a of the cored bar 35 come into contact with a positioning surface 17 formed on a magnetizing device, thereby axially positioning the rotary member 35 with respect to the magnetizing device.

Figure 2:
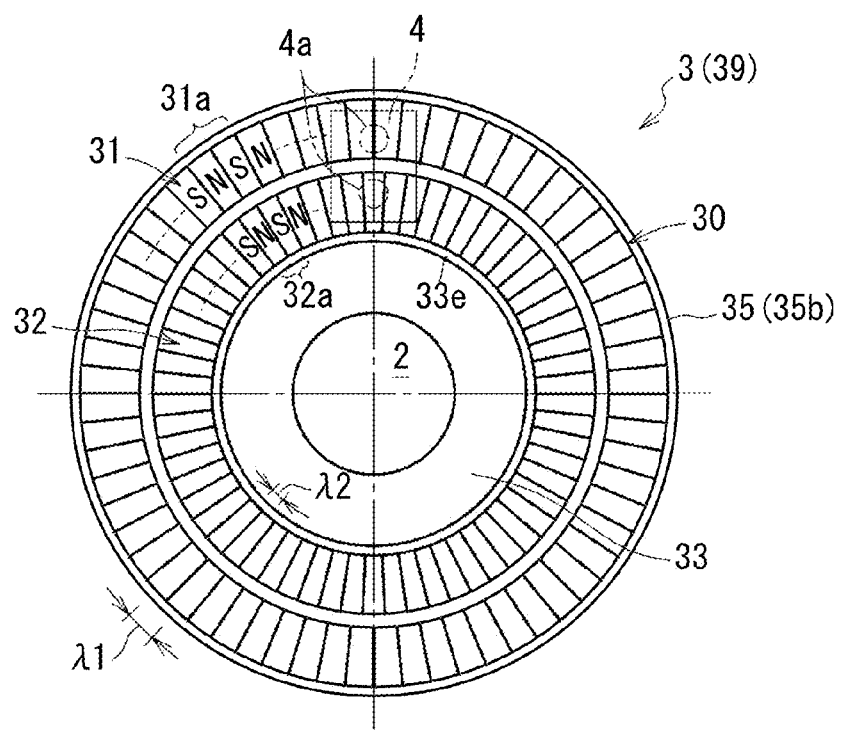
FIG. 2 is a front view of the rotation detection device illustrated in FIG. 1 when viewed in an axial direction.

In this state, magnetizing heads 18 are arranged on both axial sides of the magnetic encoder track 30. A magnetic flux is allowed to pass between the magnetizing heads 18 during index rotation of the base portion 33 and the cored bar 35. In this manner, any one of the first track 31 and the second track 32 of the magnetic encoder track 30 is magnetized. Then, after the magnetizing heads 18 are slid in the radial direction, a similar operation is repeated to magnetize another one of the tracks. As a result, the magnetic encoder device 3 illustrated in FIG. 1 and FIG. 2 is completed. The plurality of tracks may also be magnetized simultaneously during the index rotation. Besides, a method of simultaneously magnetizing all the magnetic poles can also be adopted.

The rotary shaft 2 is fixed to the base portion 33 of the rotary member 39 (magnetic encoder device 3) manufactured as described above. Then, the magnetic sensor 4 is arranged at a predetermined portion of the housing. As a result, the rotation detection device 1 illustrated in FIG. 1 and FIG. 2 is completed. Although it is preferred to fix the base portion 33 and the rotary shaft 2 through press-fitting so as to prevent misalignment therebetween, the fixing can also be achieved by another fixing method such as bonding as long as a countermeasure to avoid the misalignment is taken.

In the magnetic encoder device 3 of the present invention, the base portion 33 is made of the sintered metal. In addition, at least the mounting surface (inner peripheral surface) 33b of the base portion 33 to the rotary shaft 2 is corrected by the sizing. Therefore, the mounting surface 33b has high flatness and cylindricity, and also has excellent orthogonality to the both end surfaces 33c and 33d and coaxiality with a rotation axial center. The mounting surface 33b has high surface accuracy as described above. Thus, even when the rotary shaft 2 is rotated after the rotary shaft 2 is fitted and mounted on the mounting surface 33b of the base portion 33, whirling of the magnetic encoder track 30 can be reduced. Therefore, a geometric error of the magnetic encoder track 30 during the rotation, and further an error based on a variation in gap from the magnetic sensor 4 can be reduced. As a result, detection accuracy for the absolute angle of the rotary shaft 2 can be enhanced.

Figure 5:
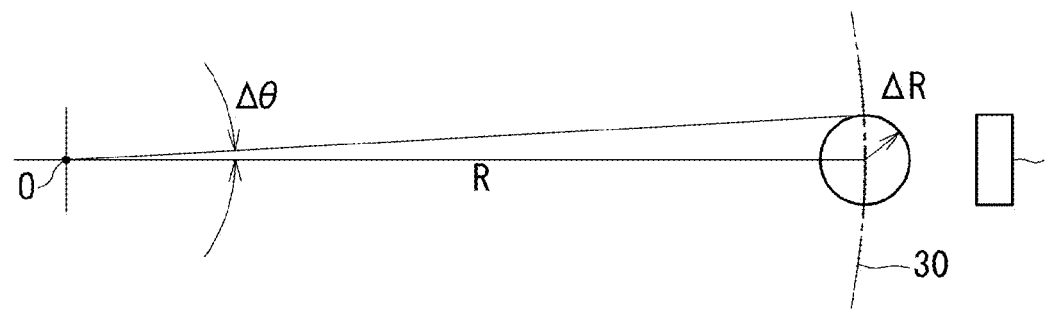
FIG. 5 is a diagram of a model for illustrating whirling of a magnetic encoder track.

Now, functions and effects thereof are described referring to a model illustrated in FIG. 5. In FIG. 5, assuming that a center of the magnetic encoder track 30 is fixed at a position decentered from a rotation axial center O by $\Delta R$ with respect to a radius R of the magnetic encoder track 30, whirling for ΔR depending on a rotation angle θ occurs in the magnetic encoder track 30. As a result, an angular error (geometric error) varying within a range of from tan Δθ to ΔR/R is observed.

For example, when one revolution is measured at a resolution of 12 bits (4,096 counts) or higher by using the double-row magnetic encoder track 30, it is desired to keep a pitch error of each of the tracks 31 and 32 of the magnetic encoder track 30 within ±0.5%. Considering a case where the magnetic encoder track 30 with 32 pole pairs is formed at a position R=25 mm, the rotation angle corresponding to one magnetic-pole pair is 360°/32=11.25°. Therefore, the pitch error of 0.5% is 11.25°×0.5%=0.05625°. In this case, an allowable amount of eccentricity is ΔR<R tan) (0.05625°=24.5 μm. Therefore, in order to hold the pitch error within 0.5% or smaller, a tolerance for the mounting surface 33*b* of the base portion 33 is desired to be set within ±20 μm. When at least the mounting surface 33*b* of the base portion 33 is formed of the sintered metal and is then subjected to the sizing, it is easy to keep the mounting surface 33*b* within the range of tolerance described above. Therefore, the magnetic encoder track 30 with the pitch error being suppressed to 0.5% or smaller can be provided at low costs.

Further, a reduced amount of whirling can suppress the variation in gap between the magnetic sensor 4 and each of the magnetic poles. In existing magnetic encoder devices, the gap between the magnetic sensor 4 and each of the magnetic poles is limited due to processing accuracy and assembly accuracy of mechanical components. A variation range thereof is large, and hence a reduction of the gap is limited. On the other hand, in the present invention, the amount of whirling of the magnetic encoder track 30 is small, and therefore the range of variation in gap can be kept within ±0.1 mm. Therefore, the gap between the magnetic sensor 4 and each of the magnetic poles can be reduced to enable output of high-quality signals with reduced noise through increase in magnetic intensity. Even in this point of view, the detection accuracy for the absolute angle of the rotary shaft 2 can be enhanced.

Further, when the magnetic encoder track 30 is magnetized as illustrated in FIG. 4, the mounting surface 33*b* of the base portion 33 is fitted over the spindle 16 of the magnetizing device, whereas any one of the end surfaces (end surface 33*c* on the opposite side to the magnetic sensor 4 in this embodiment) of the base portion 33 becomes a surface to be positioned and comes into contact with the positioning surface 17 of the magnetizing device in the axial direction. During the magnetization, a magnetic pattern is formed based on a rotation angle of the spindle as a reference. Therefore, when the whirling occurs on the magnetized surface, it becomes difficult to perform the magnetization at precise angular pitches. On the other hand, with the configuration of this embodiment, the mounting surface 33*b* and the surface 33*c* to be positioned of the base portion 33 are formed with high accuracy through the sizing. Therefore, a mounting attitude of the base portion 33 over the spindle 16 of the magnetizing device is stabilized. As a result, the magnetization is performed in a coaxial state at the same level as that during the use of the magnetic encoder device 3. Therefore, the whirling of the magnetic encoder track 30 during the magnetization is reduced to prevent the geometric error in the magnetization pattern due to the whirling. As a result, the magnetization is performed at precise angular pitches. Therefore, the absolute angle of the rotary shaft 2 can be detected with higher accuracy.

In this embodiment, in particular, the magnetic encoder track 30 of the cored bar is magnetized after the cored bar 35 is fixed on the outer peripheral surface of the base portion 33. Therefore, the magnetic encoder track 30 can be magnetized with the effects of the deformation of the cored bar 35 occurring along with the press-fitting being cancelled. Therefore, the magnetic-pole pattern with high accuracy can be formed.

Now, other embodiments of the present invention are described referring to FIG. 6 to FIG. 13. In the following description of the embodiments, a configuration and members common to the embodiment illustrated in FIG. 1 and FIG. 2 are denoted by the common reference symbols, and the overlapping description thereof is omitted. Further, description of function and effects of the configuration attained in the following embodiments, which are common to the embodiment illustrated in FIG. 1 and FIG. 2, is basically omitted.

Figure 6:
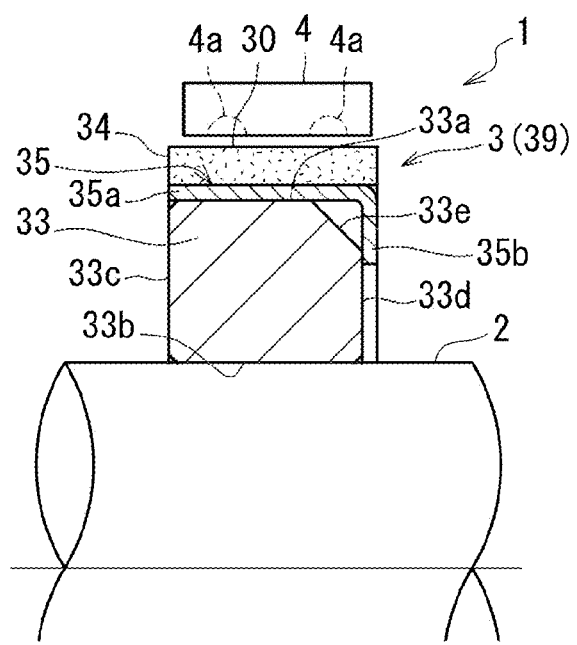
FIG. 6 is a sectional view of a radial-gap type rotation detection device.
Figure 7:
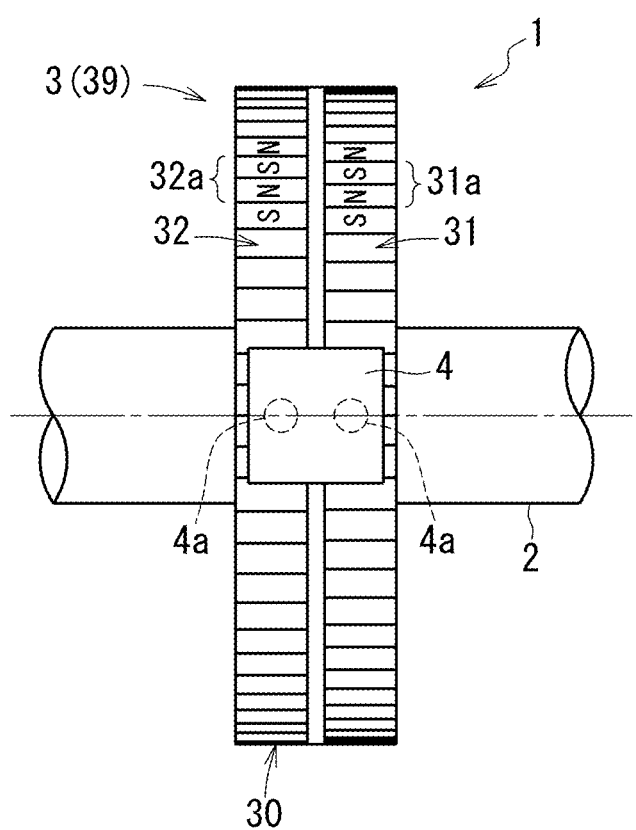
FIG. 7 is a plan view of the rotation detection device illustrated in FIG. 6.

FIG. 6 and FIG. 7 are a sectional view (FIG. 6) and a plan view (FIG. 7) of a radial-gap type rotation detection device 1. Even in this embodiment, as illustrated in FIG. 7, the magnetic encoder track 30 has a double-row arrangement. The base portion 33 is made of the sintered metal, and at least the mounting surface 33*b*, preferably, the mounting surface 33*b* and the surface 33*c* to be positioned, more preferably, all the surfaces 33*a* to 33*d* of the base portion 33 except for the chamfers 33*e* are finished with the sizing. The magnetic encoder track 30 comprises the first track 31 and the second track 32 that are separated away from each other in the axial direction. Each of the tracks 31 and 32 are formed on the outer peripheral surface of the cylindrical portion 35*a* of the cored bar 35.

In this embodiment, the flange portion 35*b* of the cored bar 35 extends in a radially inner direction to be engaged with the end surface 33*d* of the base portion 33 in the axial direction. In this case, it is preferred to set dimensions of the radially outer chamfer 33*e* of the end surface 33*d* of the base portion 33 on the flange portion 35*b* side of the cored bar 35 larger so that the base portion 33 does not interfere with a round portion on the inside of a boundary corner portion between the cylindrical portion 35*a* and the flange portion 35*b* of the cored bar 35.

Figure 8:
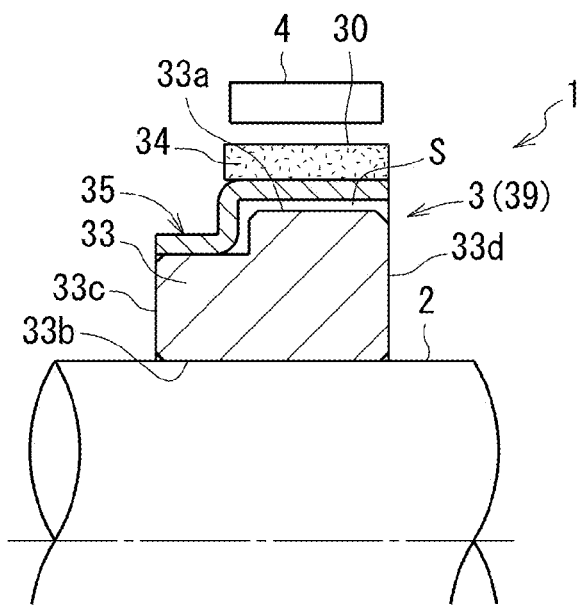
FIG. 8 is a sectional view of a radial-gap type rotation detection device.

FIG. 8 is a sectional view for illustrating another embodiment of the radial-gap type rotation detection device 1. Even in this embodiment, the magnetic encoder track 30 has a double-row arrangement. The base portion 33 is formed of the sintered metal, while at least the mounting surface 33*b* of the base portion (preferably, the mounting surface 33*b* and the surface 33*c* to be positioned, more preferably, all the surfaces) is finished with the sizing.

In the embodiment illustrated in FIG. 8, each of the outer peripheral surface of the base portion 33 and the cored bar 35 is formed to have a stepped cylindrical surface comprising a large-diameter portion and a small-diameter portion. The magnetic encoder track 30 is formed on the molded portion 34 formed on an outer peripheral surface of the large-diameter portion of the cored bar 35. Further, the small-diameter portion of the cored bar 35 is fixed to a small-diameter outer peripheral surface of the base portion 33 by press-fitting or the like. There is a clearance S between an inner peripheral surface of the large-diameter portion of the cored bar 35 and a large-diameter outer peripheral surface of the base portion 33. When both the large-diameter portion and the small-diameter portion of the cored bar 35 are press-fitted over the outer peripheral surface of the base portion 33, there is a fear in that the cored bar 35 is excessively deformed due to a difference in accuracy between the large-diameter outer peripheral surface and the small-diameter outer peripheral surface of the base portion 33 to affect the accuracy of the magnetic-pole pattern. However, the above-mentioned configuration can prevent such inconvenience.

Figure 9:
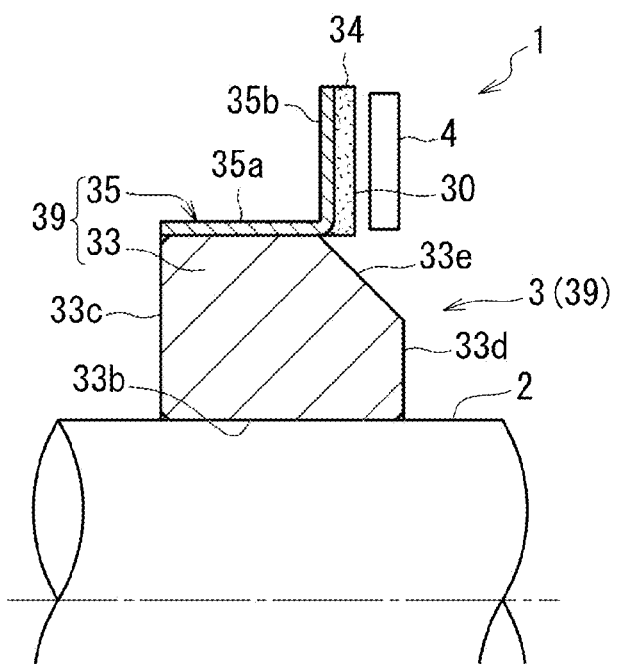
FIG. 9 is a sectional view of an axial-gap type rotation detection device.

FIG. 9 is a sectional view for illustrating a further embodiment of the axial-gap type rotation detection device 1. In the embodiment illustrated in FIG. 9, an axial length of the cylindrical portion 35a of the cored bar 35 is reduced from that of the embodiment illustrated in FIG. 1. The surface of the magnetic encoder track 30 formed on the flange portion 35b is located back from the end surface 33d of the base portion 33 on the magnetic sensor 4 side in a direction away from the magnetic sensor 4. With the configuration described above, the magnetic sensor 4 can be located in a radially outer region of the base portion 33. A space for the rotation detection device 1 can be saved (in particular, an axial dimension can be saved). Further, during transport of the magnetic encoder device 3 or the like, even if the magnetic encoder devices 3 are stacked in the axial direction, the magnetic encoder track 30 does not come into contact with the cored bar 35 of another of the magnetic encoder devices 3 or the like. As a result, deformation of and damage to the magnetic encoder track 30 can be prevented.

In this embodiment, as illustrated in FIG. 9, it is preferred that a radially outer end of the radially outer chamfer 33e of the end surface 33d of the base portion 33 on the magnetic sensor 4 side reach a position back from the end surface of the flange portion 35b on the magnetic sensor side in the direction away from the magnetic sensor 4. By increasing chamfering dimensions of the radially outer chamfer 33e as described above, there is generated an allowance in a region on the magnetic sensor 4 side of the flange portion 35b. Therefore, the formation of the molded portion 34 and the magnetization thereof can be performed smoothly.

In the embodiment described above, the case where the magnetic encoder track 30 is formed on the cored bar 35 fitted and fixed over the base portion 33 has been described as the magnetic encoder device 3 comprising the rotary member 39. However, the configuration of the magnetic encoder device 3 is not limited thereto. For example, the base portion 33 comprising the magnetic encoder track 30 formed directly thereon can be used as the rotary member 39. Now, embodiments of the above-mentioned configuration are described referring to FIG. 10 to FIG. 13.

Figure 10:
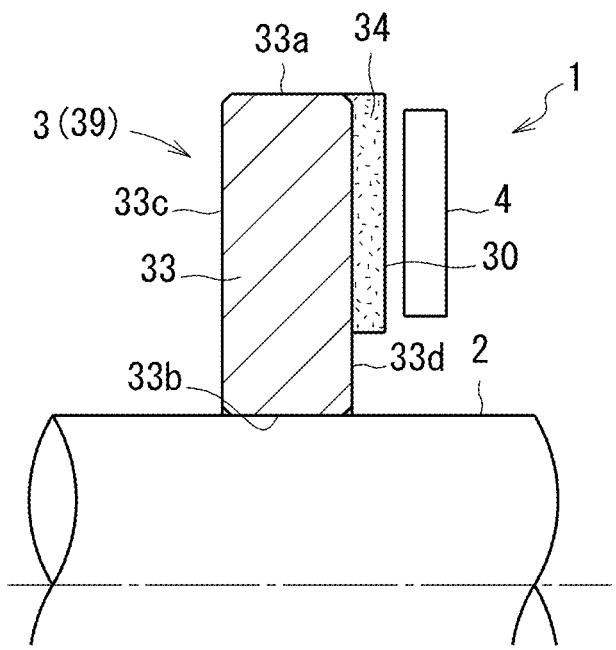
FIG. 10 is a sectional view of an axial-gap type rotation detection device.
Figure 11:
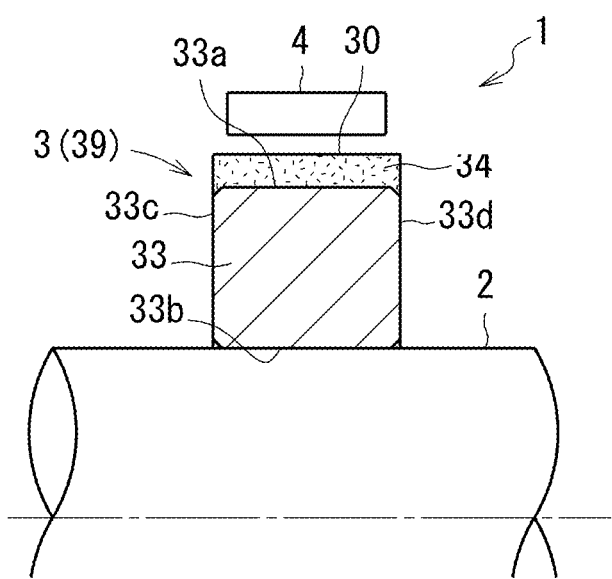
FIG. 11 is a sectional view of a radial-gap type rotation detection device.

In the embodiments described in FIG. 10 to FIG. 13, the base portion 33 made of the sintered metal is fixed onto the rotary shaft 2 by a method such as press-fitting. The double-row magnetic encoder track 30 is formed on the molded portion 34 that is directly provided on the surface of the base portion 33 without using the cored bar 35. FIG. 10 is an illustration of the axial-gap type rotation detection device 1 comprising the magnetic encoder track 30 formed on the end surface 33d of the base portion 33 on the magnetic sensor 4 side, and FIG. 11 is an illustration of the radial-gap type rotation detection device 1 comprising the magnetic encoder track 30 formed on the outer peripheral surface 33a of the base portion 33.

In any of the embodiments illustrated in FIG. 10 and FIG. 11, at least the mounting surface 33b (preferably, the mounting surface 33b and the surface 33c to be positioned, more preferably, all the surfaces except for the chamfers 33e) of the base portion 33 formed of the sintered metal is subjected to the sizing. As a result, similarly to the embodiment illustrated in FIG. 1 and FIG. 2, the whirling of the magnetic encoder track 30 can be reduced to enable the enhancement of the detection accuracy for the absolute position of the rotary shaft 2.

Figure 12:
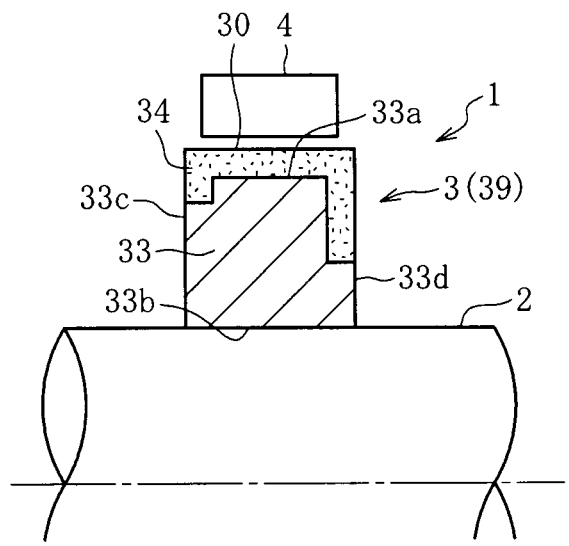
FIG. 12 is a sectional view of a radial-gap type rotation detection device.
Figure 13:
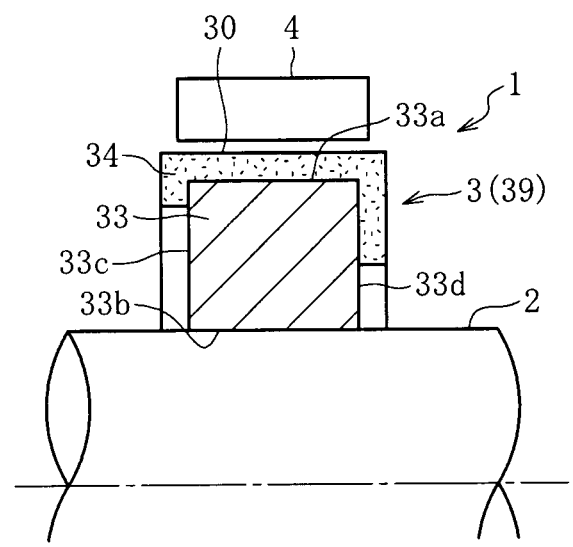
FIG. 13 is a sectional view of a radial-gap type rotation detection device.

An embodiment illustrated in FIG. 12 and FIG. 13 corresponds to the embodiment of the radial-gap type illustrated in FIG. 11 in which radially outer regions of the outer peripheral surface 33a and the both end surfaces 33c and 33d of the base portion 33 are covered with the molded portion 34 and the magnetic encoder track 30 is formed on an outer peripheral surface of the molded portion 34. By covering not only the outer peripheral surface 33a of the base portion 33 but also the both end surfaces 33c and 33d with the molded portion 34 in the above-mentioned manner, the molded portion 34 is less liable to be peeled and dropped off the base portion 33. Although the outer peripheral surface 33a of the base portion 33 is the stepped cylindrical surface in the embodiment illustrated in FIG. 12, the outer peripheral surface 33a of the base portion 33 has the same diameter dimension in the axial direction in the embodiment illustrated in FIG. 13.

As described above, when a composite molded product of the base portion 33 and the molded portion 34 that are respectively made of different types of materials is used under an environment where a temperature change is significant, there is a fear of occurrence of peeling (uplift or stripping) or a crack in a part of a region of the molded portion 34 at a boundary portion with the base portion 33. When the peeling or crack is left, the base portion 33 and the molded portion 34 do not rotate in synchronization with each other due to vibration or the like to cause an infinitesimal phase shift in some cases. In particular, when the absolute angle of the rotary shaft 2 is detected as in the case of the magnetic encoder device 3 of this embodiment, the infinitesimal phase shift as described above significantly affects the detection accuracy for the absolute angle.

The problem of the peeling of the molded portion 34 and the like described above can be prevented to a certain degree by covering radially outer regions of the both end surfaces 33c and 33d in addition to the outer peripheral surface 33a of the base portion 33 with the molded portion 34 to increase a contact area of the molded portion 34 with the base portion 33, which is not necessarily satisfactory.

Now, examples of countermeasures that keep the peeling of the molded portion 34 or the like less liable to occur are described as first to fourth countermeasures, taking the radial-gap type as an example. In the following description, members and elements that are common to the members and elements described in each of the embodiments in terms of functions and configuration are denoted by the same reference symbols, and the description thereof is basically omitted.

[First Countermeasure]

Figure 14:
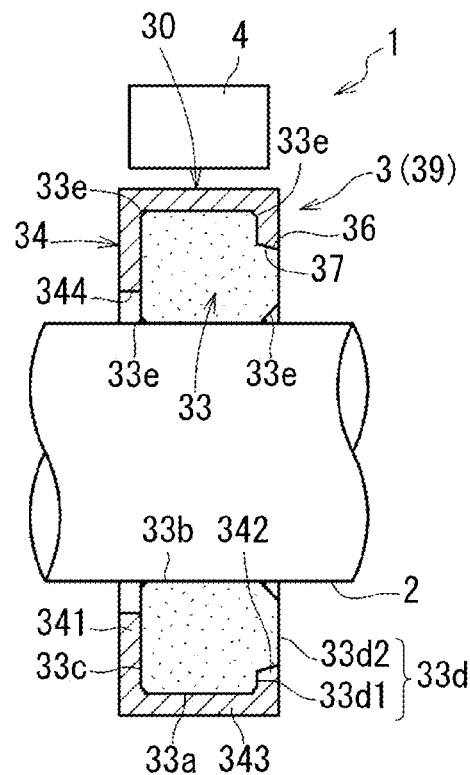
FIG. 14 is a sectional view of a radial-gap type rotation detection device.

As illustrated in FIG. 14, the rotary member 39 (magnetic encoder device 3) comprises the base portion 33 made of the sintered metal and the molded portion 34 formed on the surface of the base portion 33. Compositions of the base portion 33 and the molded portion 34 are common to those of the base portion 33 and the molded portion 34 illustrated in FIG. 1. Of the outer peripheral surface 33a and the inner peripheral surface 33b of the base portion 33, the outer peripheral portion 33a is opposed to a sensing surface of the magnetic sensor 4 through the molded portion 34 therebetween, and the inner peripheral surface 33b forms a mounting surface for mounting to the rotary shaft 2.

The molded portion 34 covers the outer peripheral surface 33a of the base portion 33 and both axial end portions of the base portion 33 in a continuous manner, and is formed integrally to comprise a first plate portion 341 and a second plate portion 342, each having a flat-plate shape, and a cylindrical portion 343 having a cylindrical shape. Thicknesses of the first plate portion 341, the second plate portion 342, and the cylindrical portion 343 are substantially the same. In the embodiment illustrated in FIG. 14, the first plate portion 341 covers a radially outer region of the end surface 33c of the base portion 33 on one axial side. The end surface 33d of the base portion 33 on another axial side has a step in the axial direction. The second plate portion 342 covers an end surface 33d1 of the stepped end surface 33d on the one axial side. Further, the cylindrical portion 343 covers the outer peripheral surface 33a of the base portion 33. The chamfer 33e of the base portion 33 on the radially inner side is exposed without being covered with the molded portion 43.

In this embodiment, radially inner dimensions of the first plate portion 341 and the second plate portion 342 are both larger than a radially inner dimension of the base portion 33. The radially inner dimension of the second plate portion 342 is larger than the radially inner dimension of the first plate portion 341. The step in the axial direction is present between an end surface of the first plate portion 341 of the molded portion 34 and the end surface 33c of the base portion 33 on the one axial side. An end surface of the second plate portion 342 of the molded portion 34 and a part of the end surface 33d (an end surface 33d2 of the stepped end surface 33d on the another axial side) of the base portion 33 on the another axial side are present on the same plane in the radial direction.

Figure 15:
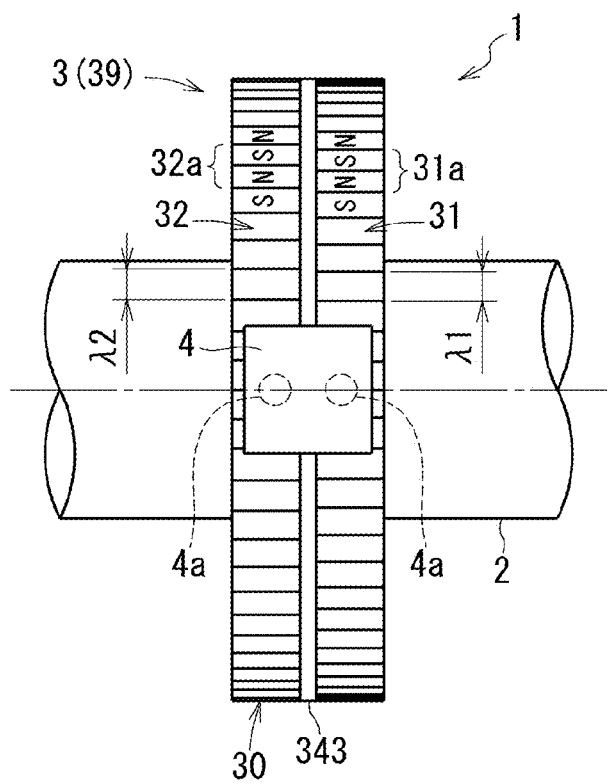
FIG. 15 is a plan view of the rotation detection device illustrated in FIG. 14 when viewed in a radial direction.

FIG. 15 is a plan view of the rotation detection device 1 illustrated in FIG. 14 when viewed from the sensor 4 side.

As illustrated in FIG. 14 and FIG. 15, the magnetic encoder track 30 comprising the first track 31 and the second track 32 is formed on an outer peripheral surface of the cylindrical portion 343 of the molded portion 34. The first track 31 and the second track 32 have the same diameter dimension. The magnetic-pole pairs 31a and 32a, each comprising the N-pole and the S-pole, are arranged respectively in the first track 31 and the second track 32 to be magnetized so that the different magnetic poles are arranged alternately in the circumferential direction. In this embodiment, the magnetic poles of the first track 31 are arranged at the equal pitches λ1, whereas the magnetic poles of the second track 32 are arranged at the equal pitches λ2 (in the embodiment illustrated in FIG. 15, λ1<λ2). The number of (for example, 32) magnetic-pole pairs 31a in the first track 31 is different from that of (for example, 31) magnetic-pole pairs 32a in the second track 32. For example, when the number of magnetic-pole pairs 31a in the first track 31 is set to an arbitrary number n, the number of magnetic-pole pairs 32a expressed by n±1 can be provided in the second track 32. In this manner, one revolution of the rotary shaft 2 can be detected as an absolute angle within the range of from 0° to 360°. When the range of the detectable absolute angle is set to 180° instead of 360°, the number of magnetic-pole pairs 32a expressed by n±2 only needs to be provided in the second track 32. In this case, the detection within the range of from 0° to 180° is repeated twice for one revolution of the rotary shaft 2 (so-called "2x mode"). Similarly, when n±3 is set, the range of detection of the absolute angle is 120°. The detection is repeated three times for one revolution of the rotary shaft 2 (so-called "3x mode").

Figure 16:
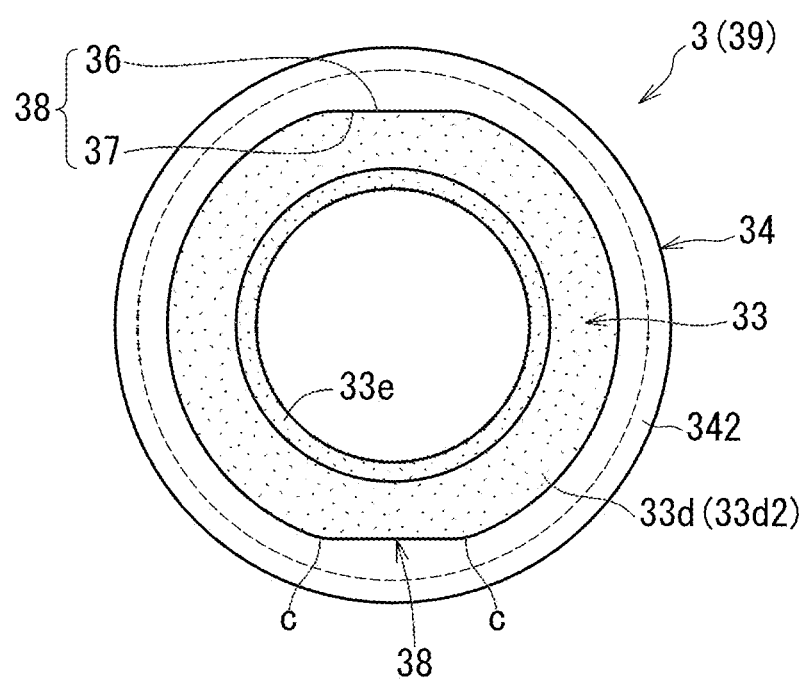
FIG. 16 is a front view of the rotation detection device illustrated in FIG. 14 when viewed from a second plate side.

FIG. 16 is a front view of the magnetic encoder device 3 when viewed from the another axial side (the second plate 342 side). As illustrated in FIG. 16, on an end portion of the base portion 33 having the cylindrical shape on the another axial side, a thinned portion 36 in a form in which a partial circumferential region of an outer peripheral surface thereof is thinned in the radial direction is formed (hereinafter referred to as "radial thinned portion"). FIG. 16 is an exemplification of the thinned portions 36 in a planar fashion. On an inner peripheral surface of the second plate portion 342 of the molded portion 34, projecting portions 37 projecting to a radially inner side are formed so as to correspond to the thinned portions 36. The thinned portions 36 and the projecting portions 37 are in a close contact state and in a state of being engaged in the circumferential direction.

Of the thinned portion 36 and the projecting portion 37, the thinned portion 36 of the base portion 33 that is directly rotationally driven by the rotary shaft 2 constructs a first engagement portion, whereas the projecting portion 37 of the molded portion 34 that is not directly rotationally driven by the rotary shaft 2 constructs a second engagement portion. The first engagement portion 36 and the second engagement portion 37 function as a rotation stopper 38 configured to prevent the infinitesimal phase difference between the base portion 33 and the molded portion 34.

In FIG. 16, the rotation stopper 38 is provided at two positions in the circumferential direction, which are opposed to each other in the radial direction. However, the rotation stopper 38 can also be formed at only one position in the circumferential direction or at three or more positions in the circumferential direction (see FIG. 23b and the like).

Next, manufacturing steps of the magnetic encoder device 3 described above are sequentially described.

First, the base portion 33 made of the sintered metal is manufactured. The base portion 33 is manufactured through the same method as that for the base portion 33 illustrated in FIG. 1. In the compression-molding step, a base powder containing iron powder added with a lubricant is molded to form a green compact. In a state of the green compact, the thinned portions 36 are formed on an outer periphery of one axial end portion. The green compact is transferred to a sintering furnace to be sintered at, for example, 1,120° C., thereby obtaining a sintered material. The lubricant added to the base powder is burnt up or volatilized during a sintering step. A density of the sintered material after the sintering is about 6.2 g/m$^3$ to about 7.0 g/cm$^3$. The sizing is performed in the same procedure as that described referring to FIG. 3.

Figure 17:
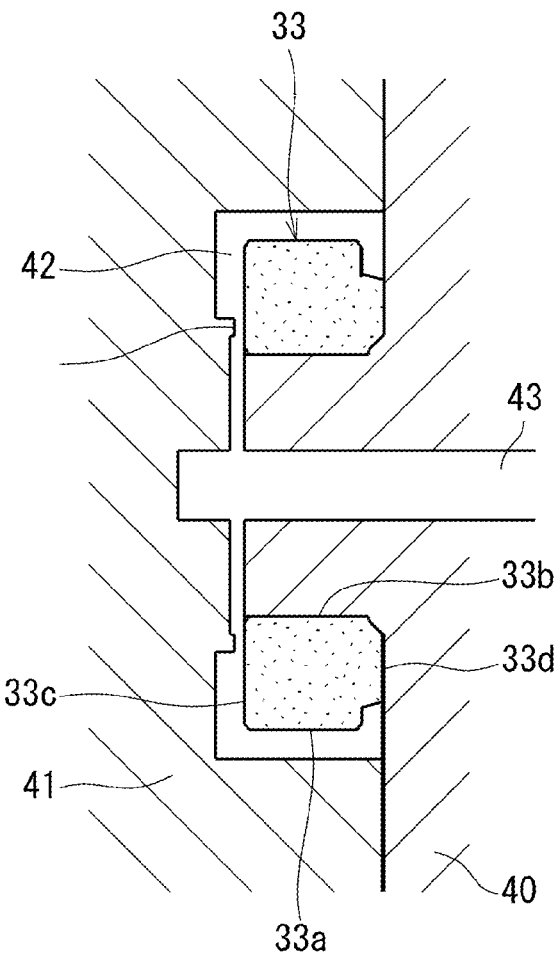
FIG. 17 is a sectional view for illustrating an injection-molding step.
Figure 18:
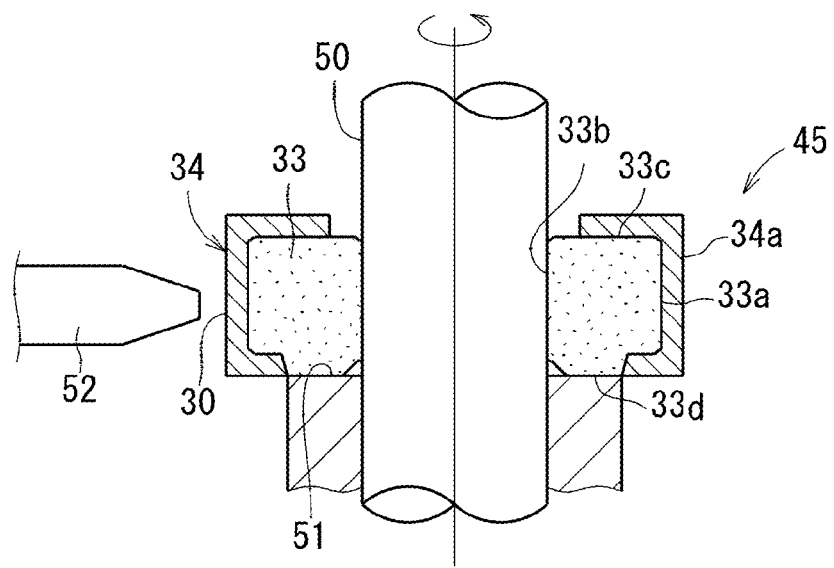
FIG. 18 is a sectional view for illustrating a magnetizing step.

The base portion 33 manufactured as described above is transferred to an injection-molding step. The injection-molding step is a step of, as illustrated in FIG. 17, inserting the base portion 33 between a fixed die 40 and a movable die 41 and holding the base portion 33 to be positioned, and injecting a resin material containing the above-mentioned thermoplastic resin and the magnetic powder into a cavity 42 formed between the dies 40 and 41 through a spool 43 and a gate 44 to mold (insert-mold) the molded portion 34. Simultaneously with the molding of the molded portion 34, the projecting portions 37 are molded by using the thinned portions 36 of the base portion 33 as a molding die. In order to prevent generation of a weldline on the molded portion 34, it is preferred to use a disc gate (film gate) as the gate 44. Along with the injection molding, processing (magnetic field press) of aligning axes of easy magnetization of the magnetic powder while applying a magnetic field to the cavity 42 is performed.

After cooling and solidification of the resin material, mold opening is performed and a molded product is ejected with an ejection pin (not shown). Along with the ejection of the molded product, gate cutting is performed to release the molded product from the dies. The injection molding is performed through the disc gate 44. Therefore, a gate mark 344 (see FIG. 14) that is a mark left after the gate cutting is formed over the entire inner peripheral surface of the first plate portion 341 of the molded portion 34.

Then, after demagnetization, the molded product is magnetized to form the magnetic encoder track 30. During the magnetization, the inner peripheral surface 33b of the base portion 33 of a molded product 45 is fitted over a spindle 50, while the end surface of the base portion 33, for example, the end surface 33d on the another axial side (surface to be positioned) is pressed against a positioning surface 51 of the magnetizing device by the chuck mechanism (not shown). At this time, in order to enhance the positioning accuracy, it is preferred that the molded portion 34 be not brought into contact with the positioning surface 51. In this manner, the molded product 45 is positioned in the axial direction and the radial direction with respect to the magnetizing device base on the inner peripheral surface 33b and one of the end surfaces (the end surface 33d in this embodiment) as references.

In this state, a magnetizing head 52 is arranged on a radially outer side of the magnetic encoder track 30. Then, during index rotation of the molded product, any one of the first track 31 and the second track 32 of the magnetic encoder track 30 is magnetized. Then, after the magnetizing head 52 is slid in the axial direction, the same operation is repeated to magnetize another of the tracks. As a result, the magnetic encoder device 3 illustrated in FIG. 14 and FIG. 15 is completed. The plurality of tracks may be magnetized simultaneously during the index rotation. Besides, a method of simultaneously magnetizing all the magnetic poles can also be adopted.

The rotary shaft 2 is fixed to the inner peripheral surface (mounting surface) 33b of the base portion 33 of the rotary member 39 (magnetic encoder device 3) manufactured as described above, and the magnetic sensor 4 is mounted at a predetermined position of the housing. As a result, the rotation detection device 1 illustrated in FIG. 14 and FIG. 15 is completed. Although the base portion 33 and the rotary shaft 2 are preferred to be fixed through press-fitting so as to prevent the misalignment therebetween, the fixing can also be achieved by another fixing method such as bonding as long as a countermeasure to avoid the misalignment is taken. For example, when the magnetic encoder device is used for a bearing device for a wheel of an automobile, the mounting surface 33b of the base portion 33 is fitted and fixed over an outer peripheral surface of an inner ring (rotary member) of the bearing device for a wheel, whereas the magnetic sensor 4 is mounted at a predetermined position of a vehicle-body side member such as a bearing outer ring or a knuckle.

After the thinned portions 36 (first engagement portions) of the base portion 33 and the projecting portions 37 (second engagement portions) of the molded portion 34 are engaged in the circumferential direction to construct the rotation stoppers 38 as illustrated in FIG. 16, even if the molded portion 34 is, for example, peeled, the phase shift between the base portion 33 and the molded portion 34 in the circumferential direction can be prevented. Therefore, even in a case where the magnetic encoder device 3 is used under conditions of use where a temperature change is significant, the absolute angle of the rotary shaft 2 can be detected with high accuracy.

In particular, with the configuration of this embodiment, at the time of insert molding illustrated in FIG. 17, the projecting portions 37 (second engagement portions) are molded by using the thinned portions 36 (first engagement portions) as the molding die. Therefore, after the molding, the first engagement portion 36 and the second engagement portion 37 can be brought into close contact with each other without any clearance. Therefore, the infinitesimal phase shift between the base portion 33 and the molded portion 34 can be more reliably prevented.

Figure 19:
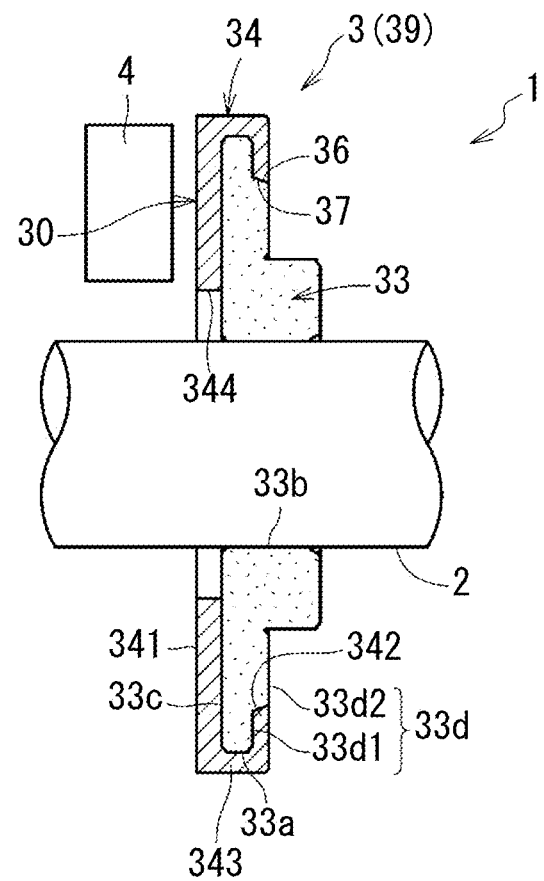
FIG. 19 is a sectional view of an axial-gap type rotation detection device.
Figure 20:
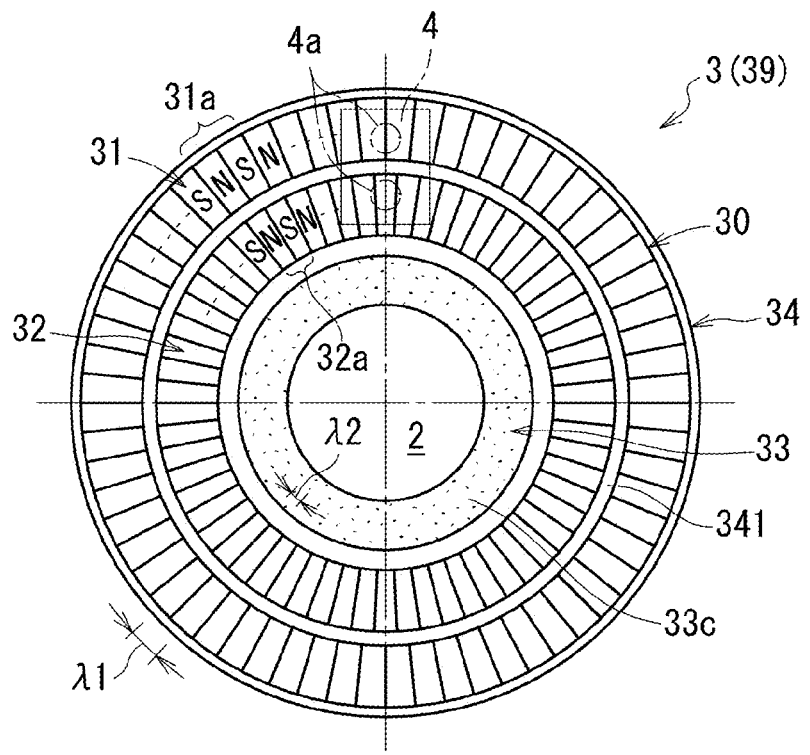
FIG. 20 is a front view of the rotation detection device illustrated in FIG. 19 when viewed from a first plate side.
Figure 21:
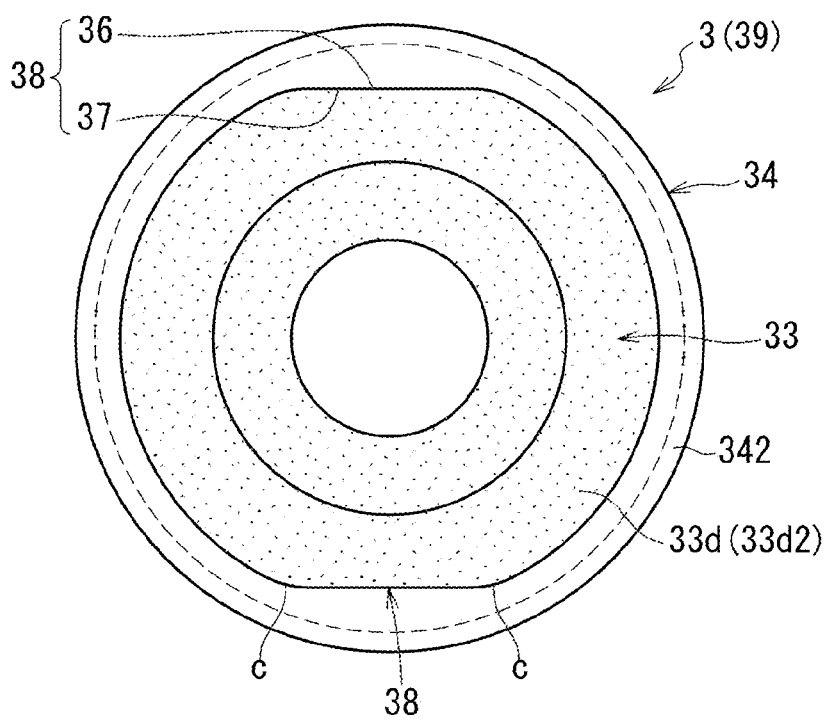
FIG. 21 is a front view of a magnetic encoder device illustrated in FIG. 19 when viewed from a second plate side.

FIG. 19 and FIG. 20 are a sectional view and a plan view of the axial-gap type rotation detection device 1. Even in this axial-gap type, the double-row magnetic encoder track 30 is formed on the molded portion 34, as illustrated in FIG. 20. Further, the base portion 33 is formed of the sintered metal, whereas at least the mounting surface 33b, more preferably, all the surfaces 33a to 33d of the base portion 33 except for the chamfers are finished with the sizing. In the axial-gap type magnetic encoder device 3, the magnetic encoder track 30 opposed to the magnetic sensor 4 is formed on the first plate portion 341. The magnetic encoder track 30 comprises the first track 31 and the second track 32 that are separated away from each other in the radial direction. Further, as illustrated in FIG. 21, the rotation stoppers 38, each being constructed of the thinned portion 36 (first engagement portion) and the projecting portion 37 (second engagement portion), are provided between the base portion 33 and the second plate portion 342, as in the embodiment illustrated in FIG. 16.

Figure 22A:
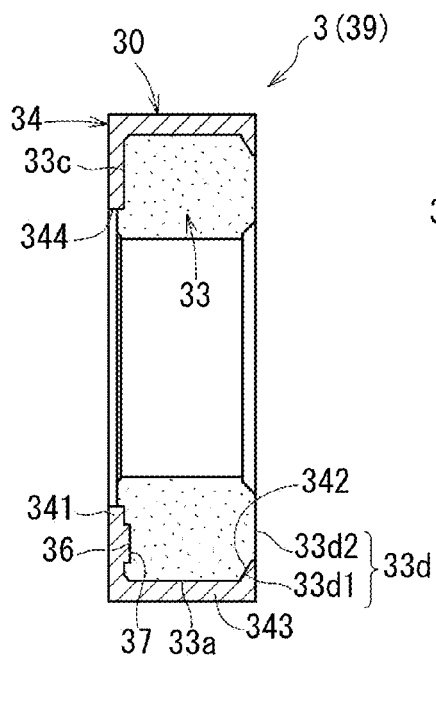
FIG. 22a is a sectional view of a magnetic encoder device.
Figure 22B:
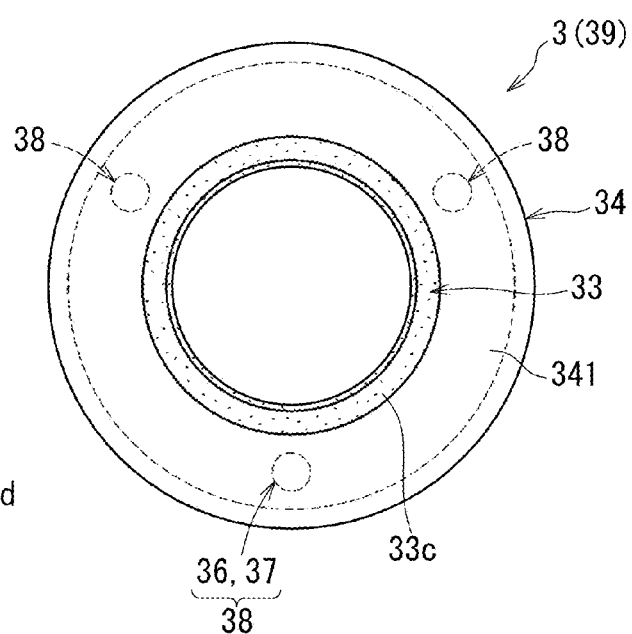
FIG. 22b is a front view of the magnetic encoder device when viewed from a first plate portion side.

FIG. 22a and FIG. 22b are illustrations of another embodiment of the rotation stopper 38, specifically, illustrations of a case where the thinned portions 36, each being in a form in which a partial region of the end surface 33c is thinned in the axial direction (hereinafter referred to as "axial thinned portion"), are formed in the base portion 33 and the projecting portions 37 in the axial direction corresponding to the thinned portions 36 are formed in the molded portion 34 to construct the rotation stoppers 38. In this embodiment, a circular hole-like concave portion formed on the end surface 33c of the base portion 33 is exemplarily illustrated as the axial thinned portion 36. Even in the configuration described above, the thinned portion 36 serving as the first engagement portion and the projecting portion 37 serving as the second engagement portion are brought into close contact with each other and are engaged with each other in the circumferential direction. Therefore, the rotation stopper 38 for the base portion 33 and the molded portion 34 can be constructed.

In the embodiment illustrated in FIG. 22a and FIG. 22b, the rotation stoppers 38 are provided between the first plate portion 341 of the molded portion 34, which is on the gate side (side closer to the gate mark 344), and the base portion 33. In this point, the embodiment is different from the embodiment illustrated in FIG. 14 to FIG. 21 where the rotation stoppers 38 are provided between the second plate portion 342, which is on a side opposite to the gate (side farther from the gate mark 344), and the base portion 33. It is preferred to form the rotation stoppers 38 between the second plate portion 342 that is on a downstream side in a direction in which the resin material flows and the base portion 33 as in the embodiment illustrated in FIG. 14 to FIG. 22 so as not to disturb a flow of the resin material inside the cavity 42 (see FIG. 17) during the injection molding. In a case where the effects in this point are minor, however, the rotation stoppers 38 can be provided between the first plate portion 341 that is on an upstream side in the direction in which the resin material flows and the base portion 33, as illustrated in FIG. 22a and FIG. 22b.

Besides, it is conceivable to provide the rotation stoppers 38 between the cylindrical portion 343 of the molded portion 34 and the base portion 33, as illustrated in FIG. 27a and FIG. 27b. When such a configuration is adopted in the radial-gap type, the magnetic field or magnetic field lines of the magnetic encoder track 30 formed on the cylindrical portion 34 is disturbed around the rotation stoppers 38, and therefore the detection accuracy is adversely affected thereby. In order to prevent the adverse effects, it is preferred to form the rotation stoppers 38 in a region that is not opposed to the sensor 4, specifically, between the first plate portion 341 and the base portion 33 or between the second plate portion 342 and the base portion 33.

In view of the description given above, it is most preferred to provide the rotation stoppers 38 between the second plate portion 342 of the molded portion 34, which is not opposed to the sensor 4 and is located on the downstream side in the direction in which the resin material flows (on the downstream side of the surface opposed to the magnetic sensor 4), and the base portion 33 regardless of whether the rotation detection device is the radial-gap type (embodiment illustrated in FIG. 14 to FIG. 16) or of the axial-gap type (embodiment illustrated in FIG. 19 to FIG. 21).

In FIG. 23*a* and FIG. 23*b* to FIG. 26*a* and FIG. 26*b*, other examples of the rotation stopper 38 are illustrated.

Figure 23A:
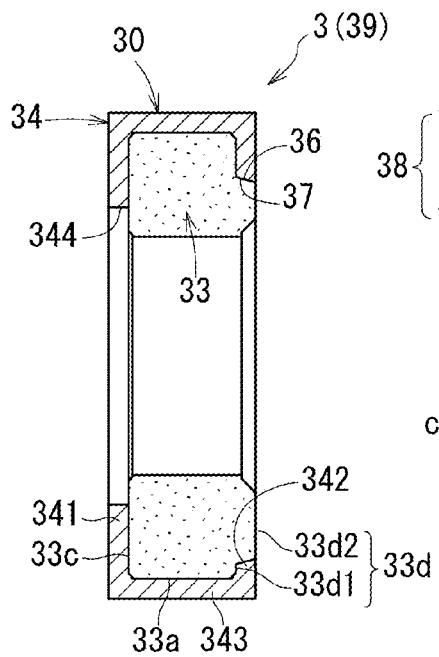
FIG. 23a is a sectional view of a magnetic encoder device.
Figure 23B:
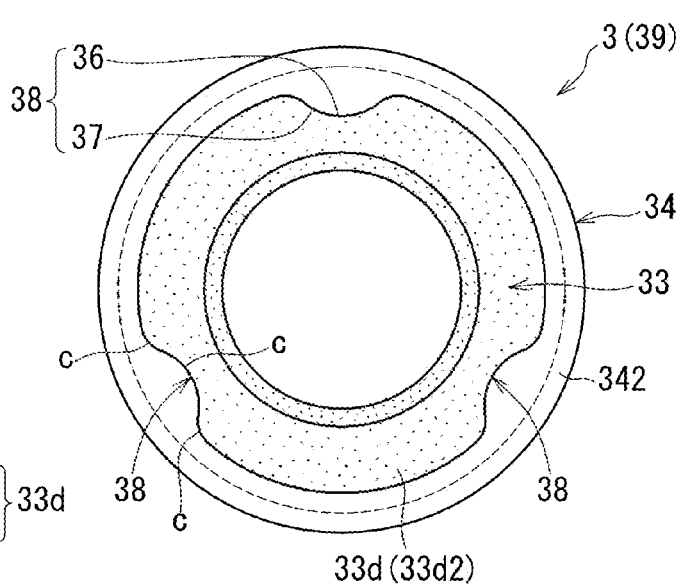
FIG. 23b is a front view of the magnetic encoder device when viewed from a second plate portion side.
Figure 24A:
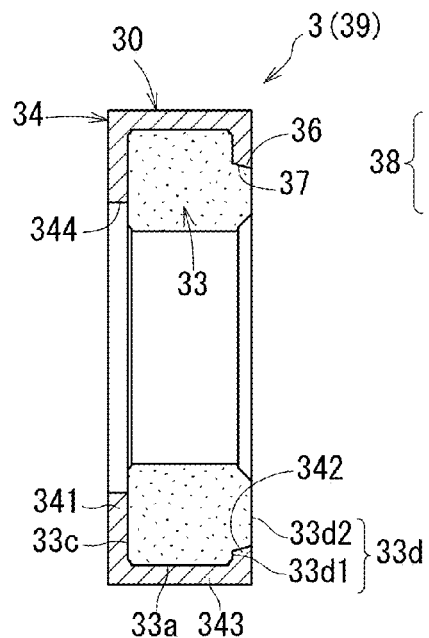
FIG. 24a is a sectional view of a magnetic encoder device.
Figure 24B:
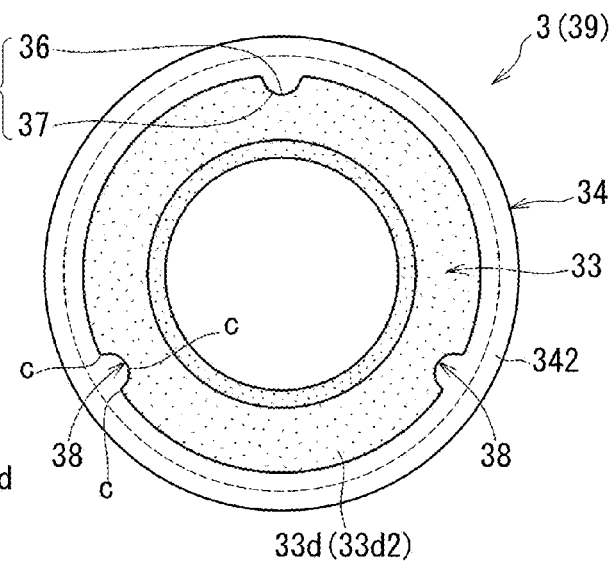
FIG. 24b is a front view of the magnetic encoder device when viewed from a second plate portion side.
Figure 25A:
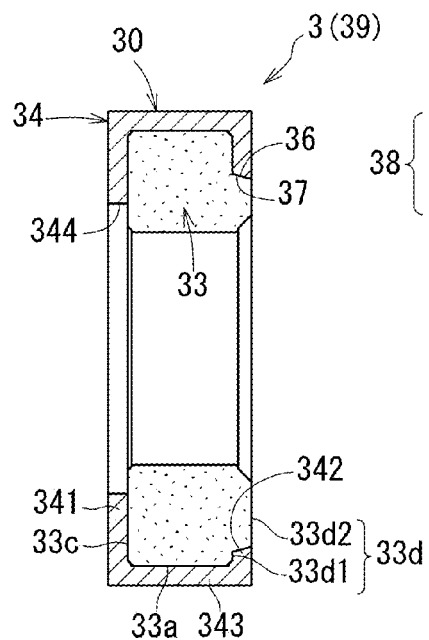
FIG. 25a is a sectional view of a magnetic encoder device.
Figure 25B:
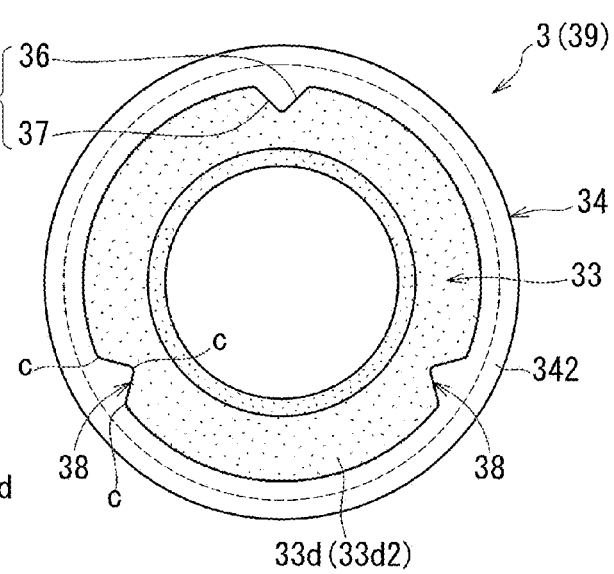
FIG. 25b is a front view of the magnetic encoder device when viewed from a second plate portion side.

FIG. 23*a* and FIG. 23*b* to FIG. 25*a* and FIG. 25*b* are illustrations of other examples of the radial thinned portions 36. Among FIG. 23*a* and FIG. 23*b* to FIG. 25*a* and FIG. 25*b*, FIG. 23*a*, FIG. 23*b*, FIG. 24*a*, and FIG. 24*b* are illustrations of the thinned portions 36, each being formed to have a concave cylindrical surface. In FIG. 23*a* and FIG. 23*b*, a curvature radius of the cylindrical surface is set larger than that illustrated in FIG. 24*a* and FIG. 24*b*. Further, in FIG. 23*a* and FIG. 23*b*, both circumferential ends of each of the thinned portions 36 and the outer peripheral surface of the base portion 33, which is adjacent thereto in the circumferential direction, are connected smoothly through a concave cylindrical surface. FIG. 25*a* and FIG. 25*b* are illustrations of the thinned portions 36, each being formed to have a V-like cross section.

FIG. 26*a* and FIG. 26*b* are illustrations of another embodiment of the axial thinned portions 36, for exemplifying a case where the thinned portions 36, each having an elongated hole shape extending in the circumferential direction, are formed.

In any of the embodiments illustrated in FIG. 23*a* and FIG. 23*b* to FIG. 26*a* and FIG. 26*b*, the projecting portion 37 has a shape that is held in close contact with the thinned portion 36. Each of the forms of the rotation stoppers 38 respectively illustrated in FIG. 23*a* and FIG. 23*b* to FIG. 26*a* and FIG. 26*b* can be similarly applied to the axial-gap type magnetic encoder device 3 illustrated in FIG. 19 to FIG. 21.

In a case where the radial thinned portions 36 are formed as illustrated in FIG. 23*a* and FIG. 23*b* to FIG. 25*a* and FIG. 25*b*, when corner portions c between the both circumferential ends of the thinned portion 36 and the outer peripheral surface of the base portion 33, which is adjacent thereto in the circumferential direction, are edges, there is a fear in that peeling, a crack, or the like is caused in the molded portion 34 that is opposed to the edge portions by a thermal stress generated due to a difference in thermal expansion coefficient between the base portion 33 and the molded portion 34. In order to prevent the occurrence of the peeling or the crack, it is preferred to form the corner portions c to have a round shape. As a curvature radius of each of the corner portions c at this time, about 0.5 mm to about 8 mm is preferred (the same applies to the corner portions c of the embodiment illustrated in FIG. 16). When the curvature radius is smaller than 0.5 mm, breakdown due to stress concentration is liable to occur. When the curvature radius exceeds 8 mm, the effects as the rotation stoppers are reduced.

As illustrated in FIG. 1, even in a case where the supporting member 35 is made of fused metal materials (for example, a pressed article of a metal plate) to have an L-like cross section and is inserted into dies to injection mold the molded portion 34, the molded portion 34 made of a different type of material from that of the supporting member 35 is peeled from the supporting member 35 to sometimes cause an infinitesimal phase shift between the supporting member 35 and the molded portion 34 when a temperature change becomes more significant. With the rotation stoppers 38 described in each of the embodiments, such a situation can be prevented. The thinned portion 36 that constructs the rotation stopper 38 can be formed simultaneously with the press working of the base portion 33.

In the description given above, of the thinned portion 36 and the projecting portion 37 that construct the rotation stopper 38, the case where the thinned portion 36 is formed on the base portion 33 and the projecting portion 37 is formed on the molded portion 34 is exemplified. Conversely, the projecting portion 37 may be formed on the base portion 33, whereas the thinned portion 36 may be formed on the molded portion 34.

[Second Countermeasure]

As a second countermeasure to prevent the peeling of the molded portion 34 or the like, it is considered to form the base portion 33 of a sintered metal containing iron and form an oxide film at least on a region of the surface of the base portion 33, which is in contact with the molded portion 34.

Figure 28:
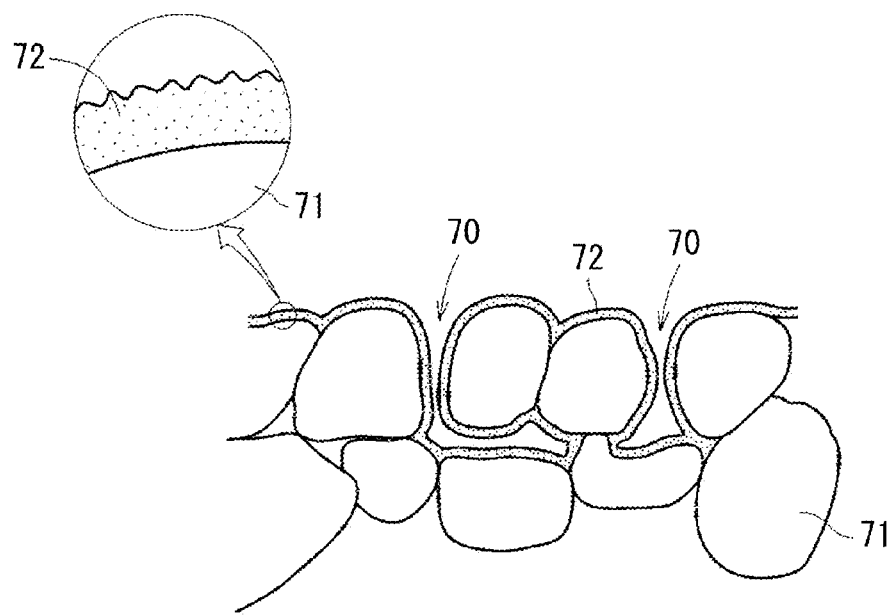
FIG. 28 is a microstructure diagram for schematically illustrating a cross section of the vicinity of a surface of a base portion.

In the second countermeasure, on the surface of the base portion 33 constructing the rotary member 39, an oxide film 72 is formed as illustrated in FIG. 28. The oxide film 72 is formed by, for example, performing steaming treatment on the sintered metal to generate $Fe_3O_4$ on the surface. The oxide film 72 covers all iron particles 71 that are present on the surface, but does not seal large pores 70 between the particles 71. Therefore, a large number of the pores 70 are open on the surface of the base portion 33 even after the formation of the oxide film 72. The steam penetrates even into the sintered compact through the pores communicating with each other. Therefore, not only in the pores between the particles 71 on the surface but also in the pores 70 formed between the particles present inside that communicate therewith, the oxide film 72 is formed. However, the oxide film 72 is not formed in a core portion of the base portion 33 into which the steam cannot penetrate. The pores communicating with each other remain as they are.

Figure 29:
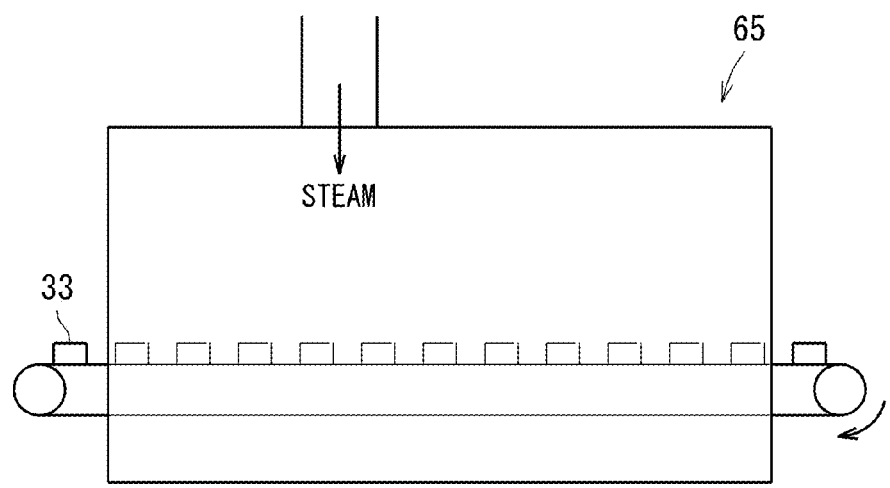
FIG. 29 is a side view for illustrating a step of forming an oxide film.

The oxide film 72 on the base portion 33 is formed by transferring the base portion 33 to a step of forming the oxide film after the step of sizing the sintered material 33' (see FIG. 3). In the oxide film formation step, steaming treatment is performed by using, for example, a belt-type steam furnace 65, as illustrated in FIG. 29. The base portions 33 are sequentially supplied onto a mesh belt of the steam furnace 65 so as to pass slowly through the furnace 65 filled with a high-temperature steam. As a result, the surface of the base portion 33 is oxidized with the high-temperature steam to form the oxide film 72 illustrated in FIG. 28. When the oxide film 72 is formed before the sizing, the oxide film 72 is broken along with the sizing. Therefore, the oxide film 72 is formed after the sizing.

Thereafter, similarly to the embodiment illustrated in FIG. 14 to FIG. 16, the molded portion 34 is formed in the injection-molding step (see FIG. 17). Further, the molded portion 34 is magnetized in the magnetizing step (see FIG. 18) to form the magnetic encoder track 30. The rotary shaft 2 is fixed onto the inner peripheral surface (mounting surface) 33*b* of the base portion 33 of the magnetic encoder device 3 manufactured as described above, and the magnetic sensor 4 is mounted at the predetermined position of the housing. As a result, the rotation detection device 1 illustrated in FIG. 14 and FIG. 15 is completed.

At this time, when the molded portion 34 is molded under a state in which the oxide film 72 is formed on the surface of the base portion 33, microasperity is formed on the surface of the oxide film 72 to increase a specific surface area of the base portion 33, thereby increasing a contact area with the molded portion 43, as illustrated in FIG. 28. In addition, the resin material forming the molded portion 34 enters the pores 70 formed on the surface of the base portion 33 to demonstrate the anchor effect. Further, the formation of the oxide film 72 enhances molecular affinity in the surface of the base portion 33 to enable an intermolecular force to act between the base portion 33 and the molded portion 34. Therefore, a high adhesion force is obtained between the base portion 33 and the molded portion 34 so that the peeling of the molded portion 34 from the base portion 33 or the like can be prevented. In this manner, the infinitesimal phase shift between the base portion 33 and the molded portion 34 is prevented to enable the detection of the absolute angle of the rotary shaft 2 with high accuracy even under conditions of use where a significant temperature change is anticipated. In this configuration, the base portion 33 is covered with the molded portion 34. Therefore, there is no need to form the oxide film on the base portion 33 made of the sintered metal in view of sealing of the pores, rust prevention, and the like. By consciously forming the oxide film 72 from a different point of view, unique effects of enhancing a peeling strength of the molded portion 34 can be produced.

Figure 30:
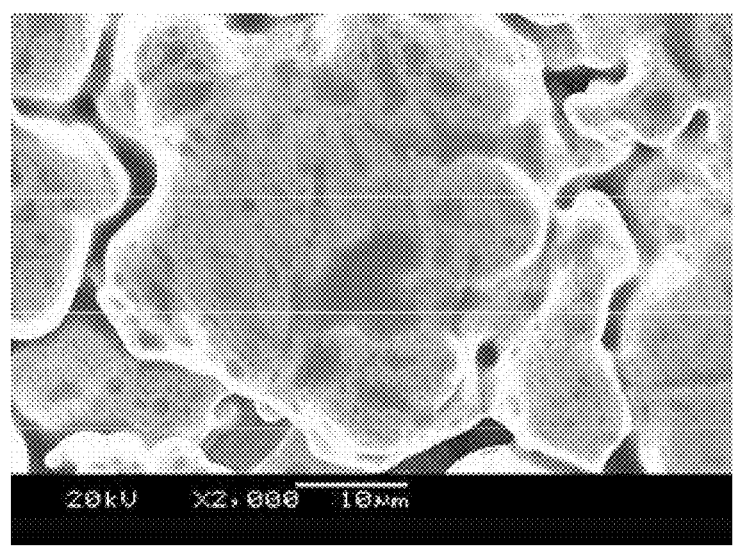
FIG. 30 is a micrograph of the surface of the base portion on which the oxide film is not formed.
Figure 31:
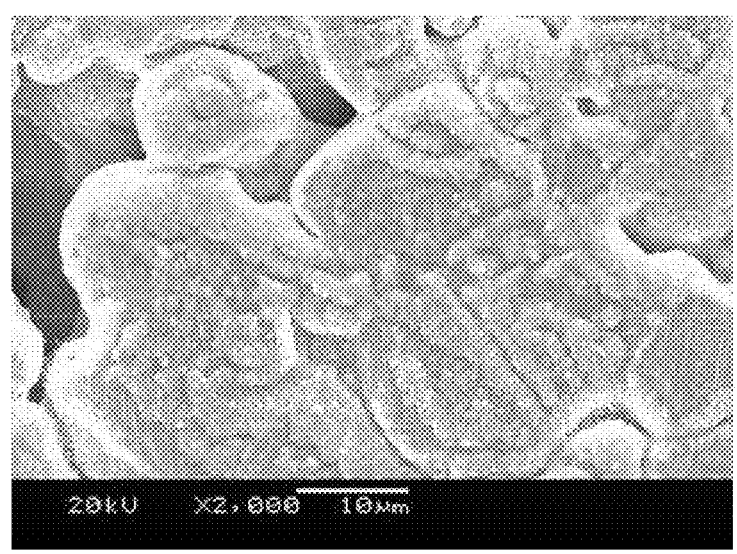
FIG. 31 is a micrograph of the surface of the base portion on which the oxide film is formed.

FIG. 30 is a micrograph of an iron-based sintered structure on which the oxide film 72 is not formed, and FIG. 31 is a micrograph of an iron-based sintered structure on which the oxide film 72 is formed. As is apparent from the comparison between FIG. 30 and FIG. 31, it is understood that surfaces of the iron particles on which the oxide film is not formed are smooth (FIG. 30), whereas microasperity is formed on the surface of the oxide film 72 that covers the iron particles through the formation of the oxide film (FIG. 31). The microasperity contributes to enhancement of the adhesion force to the molded portion 34.

Figures 32, 33:
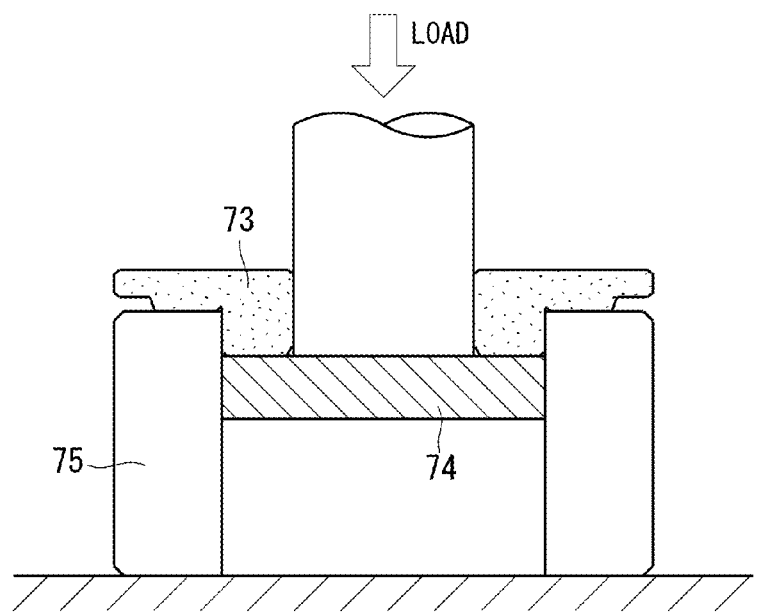
FIG. 32 is a sectional view for illustrating a method of testing a peeling strength.
FIG. 33 is a table for showing the results of test of the peeling strength.

In order to confirm the effects described above, an evaluation test for the peeling strength of the molded portion 34 was carried out with a method illustrated in FIG. 32. As a test piece, a resin material 74 of the same composition as that of the molded portion 34, which was insert-molded into a flange-like sintered metal material 73 of the same composition as that of the base portion 33, was used. While the test piece was supported by a seating 75, a constant load was applied to the resin material 74 to evaluate the degree of peeling between the resin material 74 and the sintered material 73. A TENSILON universal testing instrument UTM-5T manufactured by A&D Company, Limited was used as a testing machine, and a crosshead speed was set to 5 mm/min. A load cell was set to a full scale of 50 kgf.

The results of test were shown in FIG. 33. In the evaluation shown in FIG. 33, the cross mark indicates complete peeling of an interface, the triangle mark indicates peeling of 50% or larger of an area of the interface, and the circle mark indicates peeling of smaller than 50% of the area of the interface. As is apparent from the results of test shown in FIG. 33, it is clear that the formation of the oxide film through the steaming treatment enhances the peeling strength as compared with an untreated product. Further, the results of test prove that a furnace temperature of the steaming treatment within a range of from 530° C. to 570° C. (preferably, from 550° C. to 570° C.) is appropriate and about 25 minutes is appropriate as a time period of the steaming treatment.

A preferred amount of generation of the oxide film 72 is about 1 µm≤T≤10 µm in a film thickness T of the oxide film 72 measured in observation of a sectional structure. When the amount is smaller than the lower limit value, sufficient peeling strength is not obtained. When the amount exceeds the upper limit value, the oxide film 72 is excessively generated to seal the pores 70 on the surface, which is undesirably more liable to cause the peeling of the molded portion 34.

Incidentally, the oxide film 72 also has a property of hardening the surface of the sintered structure. Therefore, by forming the oxide film 72 on the mounting surface 33b of the base portion 33, the mounting surface 33b can be hardened. As a result, fretting wear occurring with the rotary shaft 2 can be suppressed. Further, the oxide film 72 has an insulating property. Therefore, metal corrosion due to the formation of a local cell between the rotary shaft 2 and the base portion 33 can be suppressed. Therefore, the material of the rotary shaft 2 is not required to be selected in consideration of such a phenomenon. Thus, the degree of freedom in selection of the material of the rotary shaft 2 can be increased.

In order to produce the functions and effects described above, it is sufficient to form the oxide film 72 at least on a region of the surface of the base portion 33, which is in contact with the molded portion 34, or at least on the contact region and the mounting surface 33b. It is apparent that the oxide film 72 may be formed on the entire surface of the base portion 33.

Further, even in the axial-gap type rotation detection device 1 illustrated in FIG. 19 and FIG. 20, the same functions and effects can be obtained by forming the oxide film 72 on the surface of the base portion 33.

[Third Countermeasure]

Figure 34:
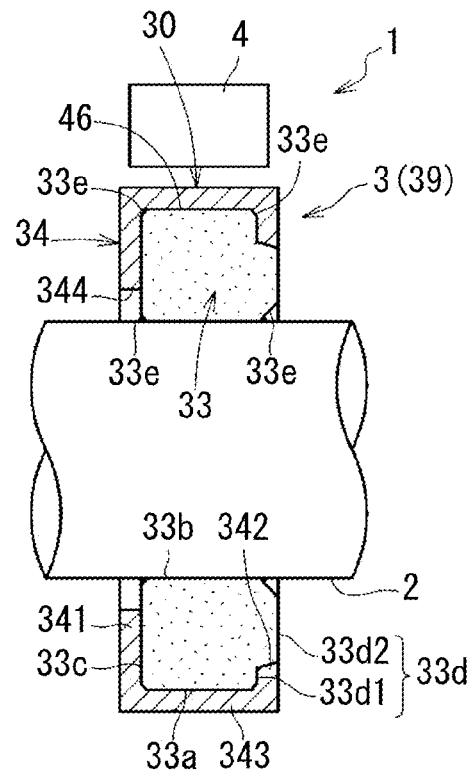
FIG. 34 is a sectional view of a radial-gap type rotation detection device.

As a third countermeasure to prevent the peeling of the molded portion 34 or the like, as illustrated in FIG. 34, it is considered to form a rough surface portion 46 having a larger surface roughness than that of the mounting surface 33b on a region of the surface of the base portion 33, which is in contact with the molded portion 34. The rough surface portion 46 can be formed in, for example, the sizing step (see FIG. 3) comprised in the steps of manufacturing the base portion 33.

Figure 35:
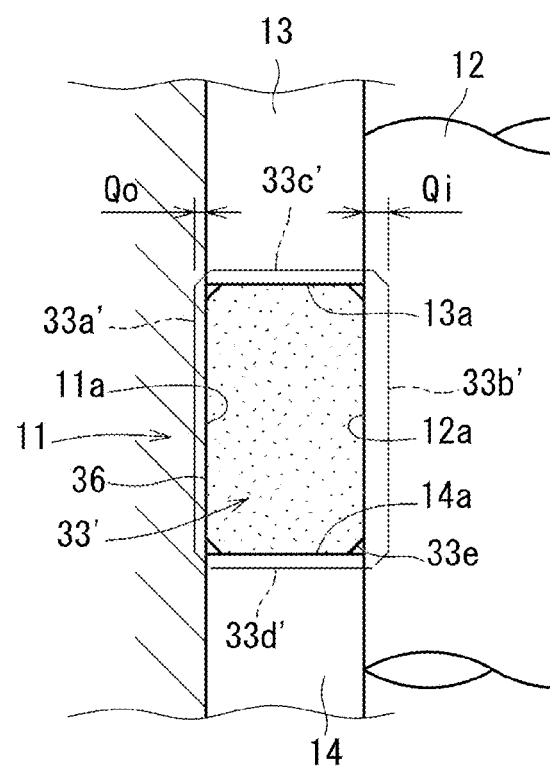
FIG. 35 is a sectional view for illustrating details of the sizing step.

In the sizing step, as illustrated in FIG. 35, a predetermined sizing allowance is provided to each of surfaces 33a' to 33d' of the sintered material 33' before the sizing, which are indicated by the two-dot chain line. At this time, a sizing allowance Qi for the inner peripheral surface 33b' is set larger than a sizing allowance Qo for the outer peripheral surface 33a' to provide a difference in sizing allowances therebetween. In this manner, the outer peripheral surface 33a' with the smaller sizing allowance has a larger surface roughness than that of the inner peripheral surface 33b' having the larger sizing allowance. As a result, the outer peripheral surface 33a' is formed as the rough surface portion 46 having the larger surface roughness. The rough surface portion 46 has a surface porosity larger than that of the inner peripheral surface 33b' and a density smaller than that of the inner peripheral surface 33b' because of lowered compressibility during the sizing. Each of the sizing allowances illustrated in FIG. 35 is exaggerated as compared with the actual one.

As described above, the outer peripheral surface 33a of the base portion 33 is formed as the rough surface portion 46 having the larger surface roughness than that of the inner peripheral surface 33b. As a result, the resin material that forms the molded portion 34 deeply enters the microasperity of the rough surface portion 46 during the injection molding to produce the anchor effect. Therefore, a high adhesion force can be obtained between the base portion 33 and the molded portion 34. Therefore, even under the conditions of use where a significant temperature change is anticipated, the peeling of or the crack in the molded portion 34 is prevented to prevent the infinitesimal phase shift between the base portion 33 and the molded portion 34, thereby enabling the enhancement of the detection accuracy for the absolute angle of the rotary member under the conditions described above. The rough surface portion 46 and the inner peripheral surface 33b are finished with the sizing. Therefore, the difference in surface roughness between the rough surface portion 46 and the inner peripheral surface 33b can be easily obtained by setting the sizing allowances Qi and Qo of the two different from each other.

On the other hand, the inner peripheral surface 33b (mounting surface) having the smaller surface roughness becomes a hard surface with high accuracy because of increased compressibility. Therefore, mounting accuracy for the magnetic encoder device 3 (rotary member 39) to the rotary shaft 2 can be enhanced. Further, positioning accuracy for the base portion 33 during the injection molding can be enhanced to enhance molding accuracy of the molded portion 34, thereby enabling the enhancement of magnetization accuracy for the magnetic encoder track 30. As described above, the magnetic encoder device 3 capable of detecting the absolute angle of the rotary member with high accuracy over a wide temperature range can be provided.

In general, in the magnetic encoder device 3, the surface of the molded portion 34 (the outer peripheral surface of the cylindrical portion 343 in this example), which is opposed to the magnetic sensor 4, becomes larger due to the formation of the magnetic encoder track 30. Correspondingly, the surface of the base portion 33 (the outer peripheral surface 33a in this example), which is opposed to the magnetic encoder track 30, is formed as the rough surface portion 46. As a result, a close-contact area between the base portion 33 and the molded portion 34 increases to enable effective enhancement of the adhesion force between the molded portion 34 and the base portion 33.

It is apparent that, in addition to the outer peripheral surface 33a of the base portion 33, another surface in contact with the molded portion 34 (radially outer regions of the end surface 33c on the one axial side and the end surface 33d on the other axial side in this example) is formed as the rough surface portion 46. As a result, the adhesion force between the molded portion 34 and the base portion 33 can be further increased. In order to enlarge the region on which the rough surface portion 46 is formed, as illustrated in FIG. 35, it is preferred to set the sizing allowances for the end surfaces 33c' and 33d' of the sintered material 33' on both axial sides smaller than the sizing allowance Qi for the inner peripheral surface 33b'.

The surface roughness of the mounting surface 33b is preferred to be set within a range of from 10% to 50% of the surface roughness of the rough surface portion 46. As specific numerical examples, the surface roughness of the mounting surface 33b set to 3.2 μm Ra or smaller and the surface roughness of the rough surface portion 46 set within a range of from 6.3 μm Ra to 12.5 μm Ra are given. In this case, it is preferred that the surface porosity of the mounting surface 33b be from 5% to 20% and the surface porosity of the rough surface portion 46 be from about 15% to about 40%. Further, it is preferred that a density of the mounting surface 33b and a peripheral region thereof be from 6.4 g/cm³ to 7.0 g/cm³, and that a density of the rough surface portion 46 and a peripheral region thereof be from 6.2 g/cm³ to 6.8 g/cm³. The surface roughness Ra means an arithmetic mean roughness defined in JIS B 0601.

Figures 36, 37:
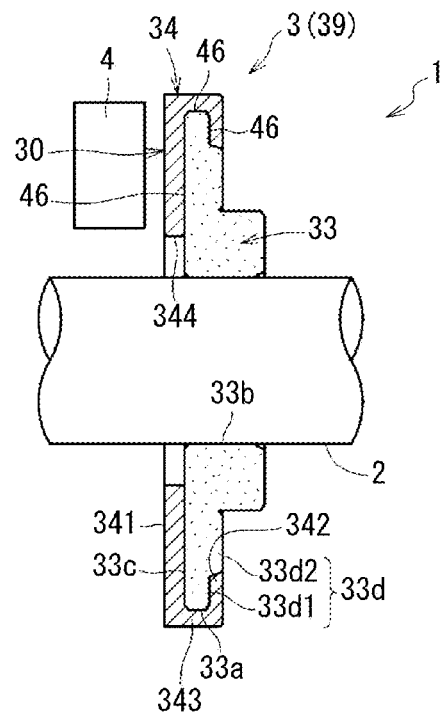
FIG. 36 is a sectional view of an axial-gap type rotation detection device.
FIG. 37 is a table for showing the results of test of the peeling strength.

Even in the axial-gap type rotation detection device 1 illustrated in FIG. 36, the surfaces 33a to 33d of the base portion 33 are finished with the sizing, while a difference in sizing allowance is provided to those surfaces. In this manner, the rough-surface portion 46 can be formed on the surfaces except for the inner peripheral surface 33b (mounting surface) of the base portion 33 (the outer peripheral surface 33a, the end surface 33c on the one axial side, and the end surface 33d on the another axial side). At this time, the rough surface portion 46 only needs to be formed at least on the end surface 33c on the one axial side, which is opposed to the magnetic encoder track 30.

[Fourth Countermeasure]

As a fourth countermeasure to prevent the peeling of the molded portion 34 or the like, it is considered to set a mean particle diameter of the base powder to from 60 μm to 100 μm for the formation of the base portion 33 through the molding and sintering of the base powder.

Specifically, in the compression molding step comprised in the steps of manufacturing the base portion 33, a base powder obtained by adding a lubricant to iron powder is molded to form a green compact. As the iron powder, atomized iron powder obtained through atomization by spraying water or a gas to a molten metal to cool the molten metal and electrolytic iron powder obtained by precipitation of electrolytic iron in a powder form are known. In the present invention, reduced iron powder is used. The reduced iron powder is obtained by reducing pulverized iron ore or a mill scale through heating, and is different from the atomized iron powder and the electrolytic iron powder that contain solid particles in that the reduced iron powder is porous (spongy) having a large number of pores. A mixture of the atomized iron powder or the electrolytic iron powder with the reduced iron powder may be used as the iron powder. Even in this case, it is preferred to use an iron powder mixture containing the reduced iron powder as a main component [a ratio of the reduced iron powder in the iron powder mixture is 50 wt % or larger (preferably, 80 wt % or larger)]. Besides, copper powder or other metal powders can be added to the base powder as needed. It is preferred to determine a blending amount thereof so that the base powder contains the iron powder as a main component [a ratio of the iron powder in the base powder is 50 wt % or larger (preferably, 90 wt % or larger)].

As the iron powder, the one having the mean particle diameter of from 60 μm to 100 μm is used. The mean particle diameter of the iron powder can be measured, for example, based on a laser diffraction scattering method. The measurement method involves radiating a laser beam to a particle group to obtain a particle size distribution and also a mean particle diameter through a calculation based on an intensity distribution pattern of diffracted and scattered light emitted therefrom. As a measurement apparatus, for example, SALD 31000 manufactured by Shimadzu Corporation can be used. Even in a case where a metal powder other than the iron powder is added to the base powder, it is preferred to set the mean particle diameter within the above-mentioned range.

In this example, the base portion 33 is formed by using the iron powder having the mean particle diameter of from 60

μm to 100 μm, and the sintered structure is formed of rough particles. Therefore, the surface roughness of the sintered structure can be increased to Ra of about 6.3 μm to about 12.5 μm. Further, the large number of pores formed between the iron particles after the sintering have a sufficient size. Therefore, the specific surface area of the base portion 33 is increased. As a result, the resin material easily enters the micro-concave portions and the pores on the surface of the sintered structure during the injection molding to enhance the anchor effect. Therefore, the high adhesion force can be obtained between the base portion 33 and the molded portion 34 to enable the prevention of the peeling of and the crack in the molded portion even under the conditions of use where a significant temperature change is anticipated. In this manner, the infinitesimal phase shift between the base portion 33 and the molded portion 34 is prevented to enable the enhancement of the detection accuracy for the absolute angle of the rotary shaft 2.

When the mean particle diameter of the powder is smaller than 60 μm, the surface of the base portion 33 is smoothened to reduce the specific surface area. Therefore, the adhesion force between the base portion 33 and the molded portion 34 becomes insufficient. When a molding pressure on the green compact or the sizing allowance at the time of sizing after the sintering is reduced, the surface of the sintered structure can be roughened. In this case, however, it becomes difficult to satisfy necessary accuracy such as roundness or cylindricity required for the mounting surface 33b. On the other hand, when the surface is roughened while controlling the mean particle diameter of the powder, such inconvenience can be prevented. When the mean particle diameter of the powder is larger than 100 μm, contact portions between the particles are reduced to lower a mechanical strength of the base portion 33 or increase the surface roughness Ra. As a result, there arises a disadvantage such as reduction in surface accuracy such as the flatness or the cylindricity of the mounting surface 33b after the sizing.

Further, with the use of the porous reduced iron powder as the iron powder, the specific surface area of the base portion 33 can be further increased to enable further enhancement of the adhesion force between the base portion and the molded portion.

In order to confirm the effects described above, an evaluation test for the peeling strength of the molded portion 34 was carried out with the testing machine illustrated in FIG. 32. The test conditions are the same as those described above.

Further, in this test, the reduced iron powder was sieved with JIS sieves with 250 meshes (sieve opening of 63 μm), 200 meshes (sieve opening of 75 μm), and 150 meshes (sieve opening of 106 μm). The sieved three types of reduced iron powder having different particle sizes were used to respectively manufacture the sintered metal materials 73 (iron at 100 wt %). Along with this, the sintered material 73 manufactured of the atomized iron powder alone was also manufactured.

The results of test are shown in FIG. 37. Among the evaluation results shown in FIG. 37, the cross mark indicates complete peeling of an interface, the triangle mark indicates peeling of 50% or larger of an area of the interface, and the circle mark indicates peeling of smaller than 50% of the area of the interface. As is apparent from the results of test shown in FIG. 37, it is understood that the peeling strength is enhanced as the particle size of the iron powder becomes larger. Further, it is also understood that the use of the reduced iron powder rather than the atomized iron powder is effective for the enhancement of the peeling strength even with the same particle size. From the above-mentioned results of test, it is most preferred to manufacture the base portion 33 of the reduced iron powder having the mean particle diameter of from 60 μm to 100 μm.

The above-mentioned fourth countermeasure can be similarly applied to the axial-gap type magnetic encoder device 3 illustrated in FIG. 19 and FIG. 36.

Further, the first countermeasure to the fourth countermeasure described above can also be adopted solely. In addition, arbitrary two or more thereof can be adopted in combination.

[Other Embodiment]

As illustrated in FIG. 14 and the like, when the thickness-reduced portion such as the chamfer 33e is formed between the outer peripheral surface and the end surface of the base portion 33, a variation occurs in distance between the magnetic sensor 4 and the base portion 33 that is the magnetic body present behind the magnetic encoder track 30 to adversely affect the detection accuracy for the absolute angle. An embodiment for avoiding such harmful effects is described below.

Figure 38:
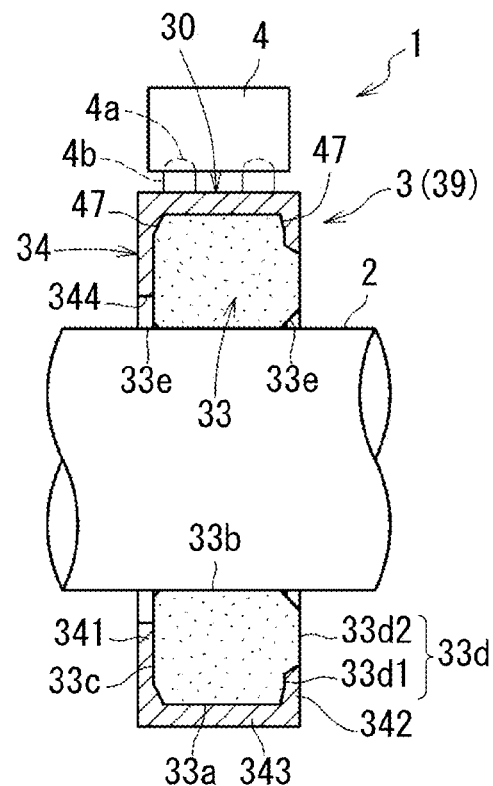
FIG. 38 is a sectional view of a radial-gap type rotation detection device.

As illustrated in FIG. 38, in this embodiment, the base portion 33 is formed of a porous sintered metal into a cylindrical shape. The sintered metal containing a large amount of iron is used to function as the magnetic body. An iron content in the sintered metal is preferably set as large as possible. In this embodiment, the sintered metal containing iron at 100 wt % is used. As long as iron is contained as a main component, a sintered metal containing copper or other metals may be used. The base portion 33 is not impregnated with lubricating oil. Of the outer peripheral surface 33a and the inner peripheral surface 33b of the base portion 33, the outer peripheral surface 33a is opposed to the sensing surface of the magnetic sensor 4 through the molded portion 34, whereas the inner peripheral surface 33b forms the mounting surface for mounting to the rotary shaft 2.

The chamfers 33e are respectively formed between the end surface 33c of the base portion 33 on the one axial side (on the left in FIG. 38) and the inner peripheral surface 33b and between the end surface 33d on the another axial side (on the right in FIG. 38) and the inner peripheral surface 33b. Further, thickness-reduced portions 47 are formed between the end surface 33c on the one axial side of the base portion 33 and the outer peripheral surface 33a and between the end surface 33d on the another axial side and the outer peripheral surface 33a.

Figure 39:
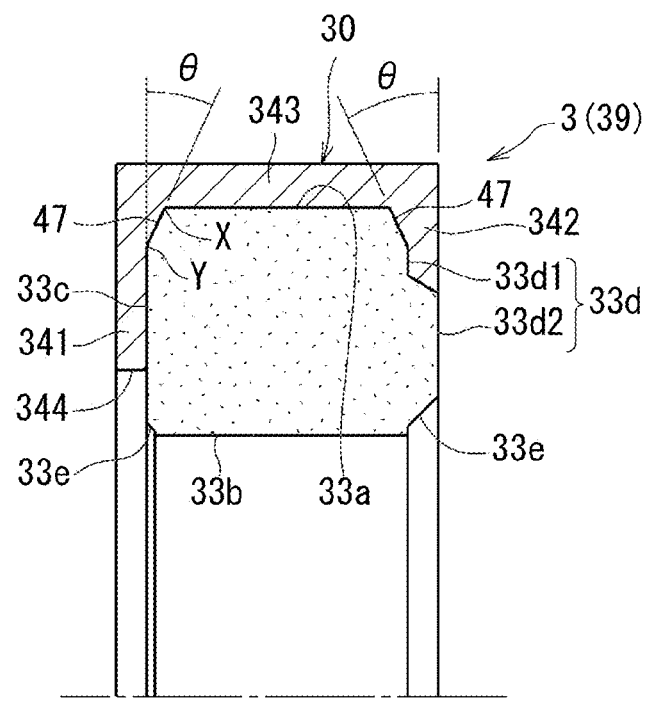
FIG. 39 is an enlarged sectional view of a magnetic encoder device illustrated in FIG. 39.

The thickness-reduced portion 47 has a form in which a thickness of a corner portion at an intersection formed by extending a contour of the outer peripheral surface 33a and a contour of each of the end surfaces 33c and 33d of the base portion is reduced. Each of the thickness-reduced portions 47 of this embodiment is formed as a chamfer having an angle θ of inclination satisfying θ<45° in the sensing direction of the magnetic sensor 4 (radial direction in this embodiment) as illustrated in FIG. 39. It is preferred to set the angle θ of inclination to 10° or larger and 40° or smaller. The remaining configurations of the base portion 33, the molded portion 34, and the magnetic encoder 30 are the same as those of the embodiment illustrated in FIG. 14 and FIG. 15.

When both the angles θ of inclination of the two thickness-reduced portions 47 are set to satisfy θ<45° as described above, as illustrated in FIG. 40, an axial distance b between radially outer ends of the two thickness-reduced portions 47 can be set larger than an axial distance a when the angles θ of inclination are set to 45° for general chamfers (indicated by the broken lines) (b>a). As long as the magnitude of each of the angles θ of inclination is within the above-mentioned range, the magnitude of the angle θ of inclination of the thickness-reduced portion 47 on the one axial side and that on the another axial side can also be set different.

The molded portion 34 covers the outer peripheral surface 33a of the base portion 33 and the both axial end portions of the base portion 33 in a continuous manner, and is formed integrally to comprise the first plate portion 341 and the second plate portion 342, each having a flat-plate shape, and the cylindrical portion 343 having a cylindrical shape. The thicknesses of the first plate portion 341, the second plate portion 342, and the cylindrical portion 343 are substantially the same. In the embodiment illustrated in FIG. 38, the first plate portion 341 covers the thickness-reduced portion 47 on the one axial side of the base portion 33 and a radially outer region of the end surface 33c. The end surface 33d on the another axial side of the base portion 33 has a step in the axial direction. The second plate portion 342 covers the end surface 33d1 on the one axial side and the thickness-reduced portion 47 on the another axial side of the stepped end surface 33d. Further, the cylindrical portion 343 covers the outer peripheral surface 33a of the base portion 33. The chamfer portions 33e of the base portion 33 on the radially inner side are exposed without being covered with the molded portion 34.

A configuration and functions of the magnetic encoder track 30 formed on the outer peripheral surface of the cylindrical portion 343 of the molded portion 34 are common to those of the embodiment illustrated in FIG. 14 and FIG. 15.

Next, steps of manufacturing the magnetic encoder device 3 described above are sequentially described. First, the base portion 33 made of the sintered metal is manufactured. The base portion 33 is manufactured through steps involving the compression molding of the metal powder, the sintering, and the sizing, which are regularly used as a method of manufacturing the sintered metal. In the compression molding step, the base powder obtained by adding the lubricant to the iron powder is supplied into the molding die and is then compressed, thereby molding the green compact having the chamfers 33e and the thickness-reduced portions 47. The green compact is transferred to the sintering furnace to be sintered at, for example, 1,120° C. As a result, the sintered metal containing Fe at 100 wt % is obtained.

The sintered material after the sintering is transferred to the sizing step. The sizing is a step of press-fitting the sintered material 33' into the die 11 while fastening the both axial end surfaces 33c' and 33d' with the punches 13 and 14 or pressurizing the both axial end surfaces 33c' and 33d' of the sintered material 33' with the punches 13 and 14 after accommodation of the sintered material 33' in the die 11 to compress the sintered metal material 33', as illustrated in FIG. 3. During the sizing, the core rod 12 is inserted into the inner periphery of the sintered metal material 33'.

Through the sizing, the outer peripheral surface 33a', the inner peripheral surface 33b', and the both end surfaces 33c' and 33d' of the sintered material 33' are respectively pressed against the inner peripheral surface of the die 11, the outer peripheral surface of the core rod 12, and the end surfaces of the punches 13 and 14 to be corrected through plastic deformation, thereby finishing each of the surfaces with high accuracy. Thereafter, the sintered metal material 33' is removed from the die 11 to complete the base portion 33.

The outer peripheral surface 33a, the inner peripheral surface 33b, and the both end surfaces 33c and 33d of the base portion 33 are all sized surfaces. The surface pores are crushed along with the sizing. Therefore, the surface porosity of each of the surfaces 33a to 33d becomes smaller than the internal porosity (of the core portion) after the sizing. The chamfers 33e and the thickness-reduced portions 47 are respectively formed on the radially inner corner portions and the radially outer corner portions on the both axial ends of the base portion 33. The chamfers 33e and the thickness-reduced portions 47 are not sized. Therefore, the surface porosity of each of those portions becomes larger than the surface porosity of each of the surfaces 33a to 33d.

Figure 41:
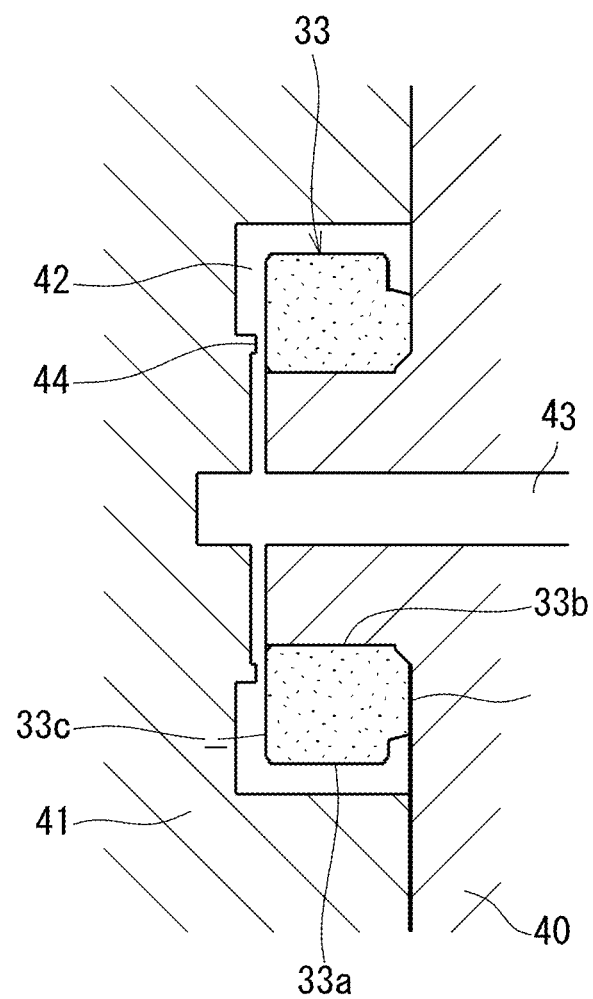
FIG. 41 is a sectional view for illustrating an injection-molding step.

Thereafter, the base portion 33 is transferred to the injection-molding step. The injection-molding step is a step of, as illustrated in FIG. 41, inserting the base portion 33 between the fixed die 40 and the movable die 41, holding the base portion 33 to be positioned, and injecting the resin material containing the above-mentioned thermoplastic resin and the magnetic powder into the cavity 42 formed between the dies 40 and 41 through the spool 43 and the gate 44 to mold (insert-mold) the molded portion 34. In order to prevent the generation of the weldline on the molded portion 34, it is preferred to use the disc gate (film gate) as the gate 44. Along with the injection molding, the processing (magnetic field press) of aligning the axes of easy magnetization of the magnetic powder while applying the magnetic field to the cavity 42 is performed.

After the cooling and solidification of the resin material, the mold opening is performed and the molded product is ejected with the ejection pin (not shown). Along with the ejection of the molded product, the gate cutting is performed to release the molded product from the dies. The injection molding is performed through the disc gate 44. Therefore, the gate mark 344 (see FIG. 38) that is a mark left after the gate cutting is formed over the entire inner peripheral surface of the first plate portion 341 of the molded portion 34.

Figure 42:
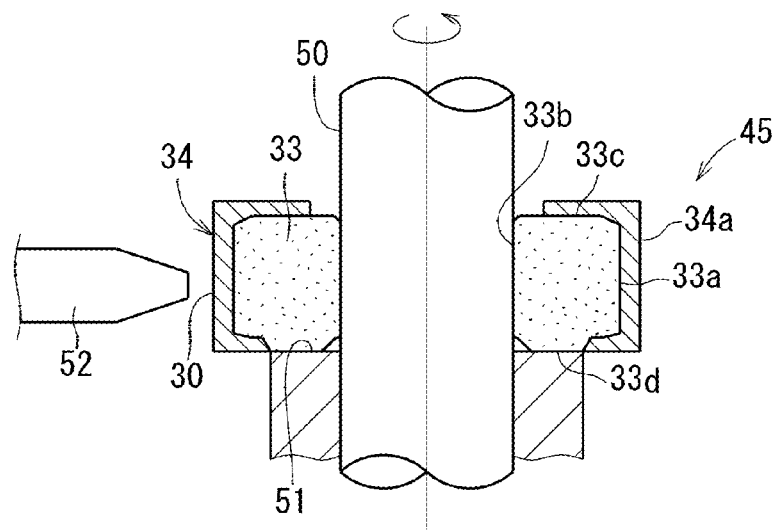
FIG. 42 is a sectional view for illustrating a magnetizing step.

Then, after the demagnetization, the molded product is magnetized to form the magnetic encoder track 30. During the magnetization, the inner peripheral surface 33b of the base portion 33 of the molded product 45 is fitted over the spindle 50, while the end surface of the base portion 33, for example, the end surface 33d on the another axial side is pressed against the positioning surface 51 of the magnetizing device by the chuck mechanism (not shown), as illustrated in FIG. 42. At this time, in order to enhance the positioning accuracy, it is preferred that the molded portion 34 be not brought into contact with the positioning surface 51. In this manner, the molded product 45 is positioned in the axial direction and the radial direction with respect to the magnetizing device based on the inner peripheral surface 33b and one of the end surfaces (the end surface 33d in this embodiment) as references.

In this state, the magnetizing head 52 is arranged on the radially outer side of the magnetic encoder track 30. Then, during index rotation of the molded product, any one of the first track 31 and the second track 32 of the magnetic encoder track 30 is magnetized. Then, after the magnetizing head 52 is slid in the axial direction, the same operation is repeated to magnetize another of the tracks. As a result, the magnetic encoder device 3 (rotary member 39) illustrated in FIG. 38 is completed. The plurality of tracks may be magnetized simultaneously during the index rotation. Besides, the method of simultaneously magnetizing all the magnetic poles can also be adopted.

Figure 40:
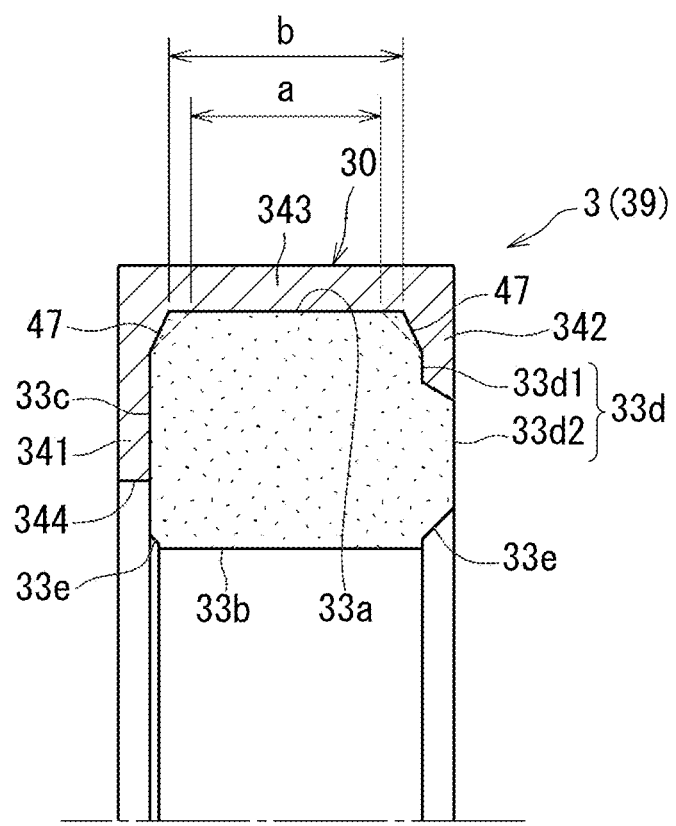
FIG. 40 is a sectional view for illustrating a product of the present invention and a related-art product in comparison.

On the surface of the magnetic body (the base portion 33 in this embodiment), the molded portion 34 containing the magnetic powder is formed. With the configuration of magnetizing the molded portion 34, a distance from the detection elements 4a to the surface of the magnetic body is required to be set constant in a region opposed to sensing regions 4b (see FIG. 38) of the detection elements 4a of the magnetic sensor 4 so as to uniformize a magnetic force generated in the magnetic encoder track 30 after the magnetization. The region of the magnetized surface, in which the distance becomes constant, becomes an effective width for the magnetization. As illustrated in FIG. 39 and FIG. 40, in this embodiment, by reducing the angles θ of inclination of the thickness-reduced portions 47, the effective width b of the magnetized surface can be set larger than the effective width a of an existing product. Therefore, the magnetic force of the magnetic encoder track 30 can be enhanced without increasing the dimensions, thereby enhancing magnetization accuracy. Further, an allowance can be provided to the distance between the detection elements 4a of the magnetic sensor. As a result, the degree of freedom in selection of the magnetic sensor 4 is enhanced. In addition, the magnetic encoder device 3 can be reduced in weight to enable reduction of the inertial moment during the rotation, thereby enabling further enhancement of the detection accuracy. As described above, compactification and enhancement of the degree of freedom in design of the rotation detection device 1 can be achieved to further enable the enhancement of the detection accuracy.

Figure 43A:
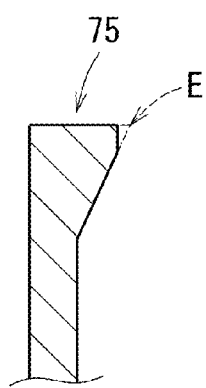
FIG. 43a is a sectional view of a molding die.
Figure 43B:
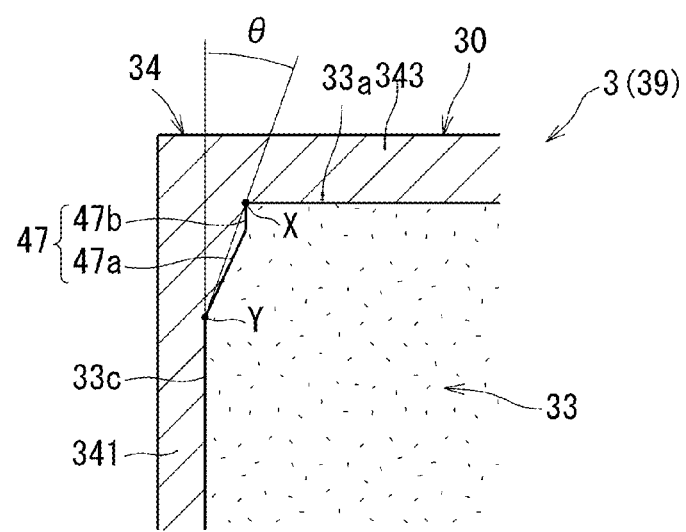
FIG. 43b is a sectional view of another embodiment of a thickness-reduced portion.

When the thickness-reduced portions 47, each being constructed of the chamfer, are formed on the base portion 33 made of the sintered metal as illustrated in FIG. 39, an acute-angled edge E is required for the molding die 75 for molding the green compact, as indicated by the broken line in FIG. 43a. As a result, a load on the molding die 75 during the molding is increased. FIG. 43b is an illustration of a countermeasure against this situation, for exemplifying a case where the thickness-reduced portion 47 comprises a chamfer 47a and a flat surface 47b adjacent to the chamfer 47a at an angle. In this case, as indicated by the solid line in FIG. 43a, the edge of the molding die 75 can be eliminated to ease the load on the molding die 75.

In the configuration described above, an angle formed by a line that connects a first boundary portion X corresponding to a boundary between a radially outer end (radially outer end of the flat surface 47b in the illustrated example) of the thickness-reduced portion 47 of the base portion 33 and outer peripheral surface 33a and a second boundary portion Y corresponding to a boundary between a radially inner end of the thickness-reduced portion 47 (radially inner end of the chamfer 47a in the illustrated example) and the end surface 33c with respect to the sensing direction (vertical direction in FIG. 39) of the magnetic sensor 4 is determined as the angle θ of inclination of the thickness-reduced portion 47. When the angle θ of inclination of the thickness-reduced portion 47 is set to satisfy θ<45° (preferably, 10°≤θ≤40°), the same effects as those described above can be obtained. Even in the embodiment illustrated in FIG. 39, a boundary between a radially outer end of a chamfer constructing the thickness-reduced portion 47 and the outer peripheral surface 33a can be considered as the first boundary portion X, whereas a boundary between a radially inner end of the chamfer and each of the end surfaces 33c and 33d can be considered as the second boundary portion Y. Even in this case, an angle (=angle θ of inclination) formed by the line connecting the first boundary portion X and the second boundary portion Y with respect to the sensing direction of the magnetic sensor 4 is set to satisfy θ<45°.

Although the thickness-reduced portion 47 on the one axial side is exemplified in FIG. 43b, the same configuration can be provided to the thickness-reduced portion 47 on the another axial side. In this case, the angles θ of inclination of the thickness-reduced portion 47 on both axial sides can also be set different.

Figure 44:
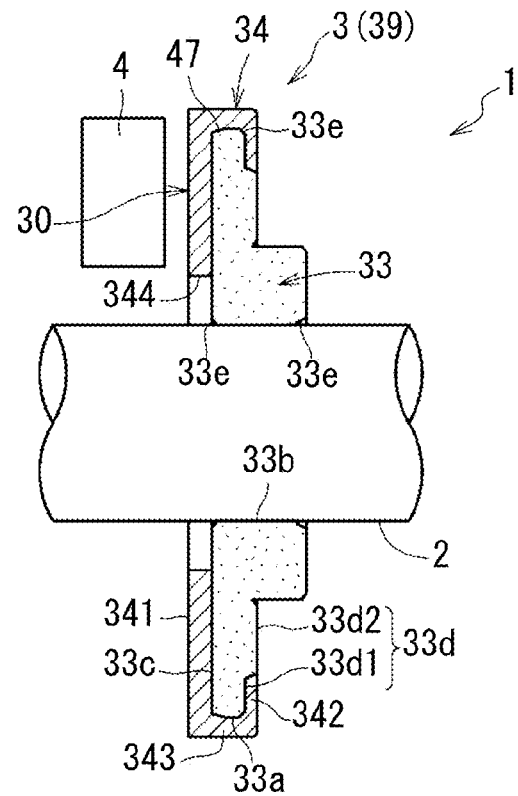
FIG. 44 is a sectional view of an axial-gap type rotation detection device.

FIG. 44 is a sectional view of the axial-gap type rotation detection device 1. Even in this embodiment, the double-row magnetic encoder track 30 is formed on the molded portion 34. Further, the base portion 33 is formed of the sintered metal, whereas at least the mounting surface 33b, more preferably, all the surfaces 33a to 33d of the base portion 33 except for the chamfers are finished with the sizing. In the axial-gap type magnetic encoder device 3, the magnetic encoder track 30 opposed to the magnetic sensor 4 is formed on the first plate portion 341. The magnetic encoder track 30 comprises the first track 31 and the second track 32 that are separated away from each other in the radial direction (see FIG. 20).

Figure 45:
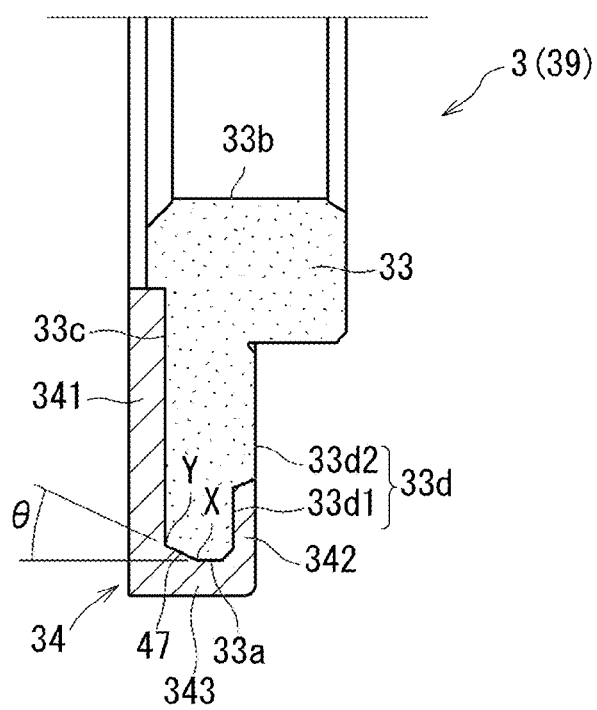
FIG. 45 is an enlarged sectional view of a magnetic encoder device illustrated in FIG. 44.

FIG. 45 is an enlarged illustration of an embodiment where the thickness-reduced portion 47 is constructed of the chamfer in the axial-gap type magnetic encoder device 3. Even in this embodiment, the angle θ of inclination of the chamfer that constructs the thickness-reduced portion 47 with respect to the sensing direction (horizontal direction in FIG. 45) of the magnetic sensor 4, in other words, the angle θ formed by a line connecting the first boundary portion X corresponding to a boundary between the chamfer and the outer peripheral surface 33a and the second boundary portion Y corresponding to a boundary between the chamfer and the end surface 33c on the one axial side with respect to the sensing direction is set to satisfy θ<45° (preferably, 10°<θ<40°). As a result, the same effects as those described above can be obtained. In this case, the same thickness-reduced portion 47 can also be formed on a radially outer corner portion of the base portion 33 on the another axial side, which is not opposed to the magnetic sensor 4. In this case, the angle of inclination of the chamfer with respect to a direction (radial direction) orthogonal to the sensing direction is arbitrary and can be set to satisfy, for example, θ≤45°.

Figure 46:
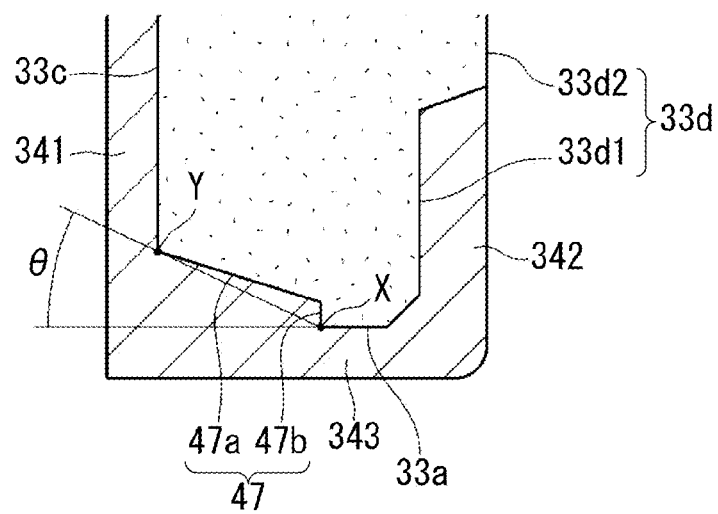
FIG. 46 is a sectional view of another embodiment of a thickness-reduced portion.

FIG. 46 is an illustration of the axial-gap type rotation detection device 1 in which the thickness-reduced portion 47 is formed to comprise the chamfer 47a and the flat surface 47b adjacent to the chamfer 47a. Even in this case, the angle formed by the line that connects the first boundary portion X corresponding to the boundary between the radially outer end of the thickness-reduced portion 47 (radially outer end of the flat surface 47b in the illustrated example) and the outer peripheral surface 33a and the second boundary portion Y corresponding to the boundary between the radially inner end of the thickness-reduced portion 47 (radially inner end of the chamfer 47a in the illustrated example) and the end surface 33c with respect to the sensing direction (horizontal direction in FIG. 46) of the magnetic sensor 4 is set as the angle θ of inclination of the thickness-reduced portion 47. The angle θ of inclination is set to satisfy θ<45° (preferably, 10°≤θ40°).

In the description given above, the case where the chamfer 47a is formed in a flat-surface shape has been exemplified. However, the shape of the thickness-reduced portion 47 is arbitrary. For example, each of the chamfer 47a can also be formed with a curved surface or a complex surface comprising a curved surface and a flat surface. The angle θ of inclination in this case is evaluated based on the angle formed by the line that connects the first boundary portion X and the second boundary portion Y with respect to the sensing direction of the magnetic sensor as described above.

In the description of each of the embodiments described above, the injection-molding material containing the thermoplastic resin and the magnetic powder as main components has been described as the injection-molding material of the molded portion 34. An arbitrary material can be used as the injection-molding material as long as the magnetization and the injection molding can be carried out. For example, the molded portion 34 can also be molded with an injection-molding material containing a rubber and the magnetic powder as main components.

Figure 47A:
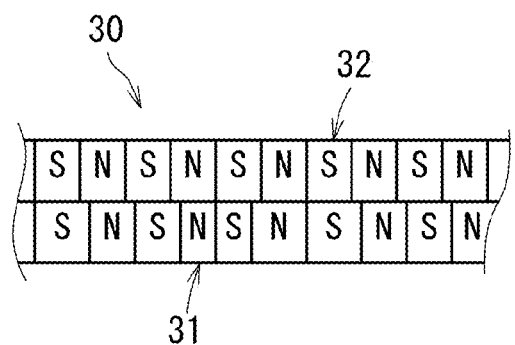
FIG. 47a is a developed view of another embodiment of a magnetic-pole pattern.
Figure 47B:
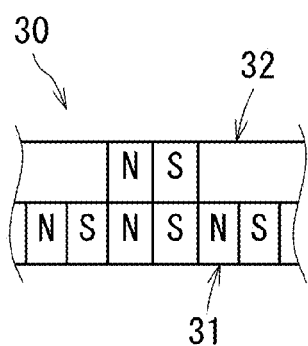
FIG. 47b is a developed view of another embodiment of the magnetic-pole pattern.

Further, in the description given above, the number of magnetic-pole pairs of the first track 31 and that of the second track 32 are set different with the magnetic poles of the first track 31 arranged at the equal pitches λ1 and the magnetic poles of the second track 32 arranged at the equal pitches λ2 has been described as the double-row magnetic encoder track 30 formed on the molded portion 34. The magnetic-pole pattern of the magnetic encoder track 30 is not limited thereto. Any magnetic-pole pattern that enables the detection of the absolute angle of the rotary shaft 2 can be adopted. For example, as illustrated in FIG. 47a, the number of magnetic-pole pairs can be set to the same number for the first track 31 and the second track 32, while the magnetic-pole pitches for the first track 31 and the second track 32 can also be irregular pitches. Besides, as illustrated in FIG. 47b, the first track 31 may be formed as a track for rotation detection in which different magnetic poles are alternatively formed at equal pitches, while the second track 32 may be formed as a track for index-signal (Z-phase) generation comprising a magnetic pole for detection of a rotation reference position is formed at one position or a plurality of positions in the circumferential direction.

The rotation detection device 1 described above can be used for a purpose that requires the detection of the absolute angle of the rotary shaft 2. In addition to the bearing device for a wheel, the rotation detection device 1 can be widely used for various types of industrial devices comprising a robot joint portion and a precise positioning device.

REFERENCE SIGNS LIST 1 rotation detection device
2 rotary shaft
3 magnetic encoder device
4 magnetic sensor
30 magnetic encoder track
31 first track
32 second track
33 base portion
33a outer peripheral surface
33b inner peripheral surface (mounting surface)
33c end surface on one axial side (surface to be positioned)
33d end surface on other axial side
34 molded portion
35 cored bar (supporting member)
36 thinned portion (first engagement portion)
37 projecting portion (second engagement portion)
38 rotation stopper
39 rotary member
46 rough surface portion
47 thickness-reduced portion
47a chamfer
47b flat surface
72 oxide film
341 first plate portion
342 second plate portion
343 cylindrical portion
344 gate mark
Qi sizing allowance
Qo sizing allowance

The invention claimed is:

1. A magnetic encoder device, comprising:
a rotary member; and
a magnetic encoder track formed on the rotary member, the magnetic encoder track comprising a plurality of magnetic poles arranged in a circumferential direction of the rotary member, each of the plurality of magnetic poles of the magnetic encoder track being movable in a region opposed to a magnetic sensor to detect an angle of rotation of a rotary shaft, wherein:
the rotary member has a first surface for mounting the rotary member to the rotary shaft, and a second surface for positioning the rotary member during formation of the magnetic encoder track by magnetization;
the first surface and the second surface of the rotary member are formed of a sintered metal, the sintered metal having a large number of micropores; and
at least the first surface and the second surface of the sintered metal are subjected to sizing.

2. The magnetic encoder device according to claim 1, wherein:
the rotary member comprises:
a base portion made of the sintered metal having the first surface; and
a supporting member fitted and fixed over the base portion; and
the magnetic encoder track is formed on the supporting member.

3. The magnetic encoder device according to claim 1, wherein the rotary member comprises a base portion made of the sintered metal having the first surface, and a molded portion formed by a rubber, a resin or a sintered compact containing a magnetic powder, and
the magnetic encoder track is formed on the molded portion.

4. The magnetic encoder device according to claim 3, wherein:
the base portion comprises a first engagement portion;
the molded portion comprises a second engagement portion configured to be engaged with the first engagement portion in the circumferential direction of the rotary member; and
the first engagement portion and the second engagement portion construct a rotation stopper.

5. The magnetic encoder device according to claim 4, wherein the second engagement portion of the molded portion is molded by using the first engagement portion of the base portion as a molding die.

6. The magnetic encoder device according to claim 3, wherein:
the base portion is formed of a sintered metal containing iron; and
an oxide film is formed at least on a contact region of a surface of the base portion with the molded portion.

7. The magnetic encoder device according to claim 6, wherein the oxide film is further formed on the first surface of the base portion.

8. The magnetic encoder device according to claim 3, wherein:
the base portion is formed by molding and sintering a base powder; and
a mean particle diameter of the base powder is set to from 60 μm to 100 μm.

9. The magnetic encoder device according to claim 8, wherein the base powder contains iron powder as a main component.

10. The magnetic encoder device according to claim 3, wherein a rough surface portion having a larger surface roughness than a surface roughness of the first surface is formed on a contact region of a surface of the base portion with the molded portion.

11. The magnetic encoder device according to claim 10, wherein the rough surface portion is formed at least on the surface of the base portion, which is opposed to the magnetic encoder track.

12. The magnetic encoder device according to claim 3, wherein:
   any one of an outer peripheral surface and an end surface of the base portion is opposed to the magnetic sensor;
   a thickness-reduced portion is formed between the outer peripheral surface and the end surface of the base portion; and
   an angle ($\theta$) of inclination formed by a line connecting a first boundary portion corresponding to a boundary between the thickness-reduced portion and the outer peripheral surface and a second boundary portion corresponding to a boundary between the thickness-reduced portion and the end surface with respect to a sensing direction of the magnetic sensor is set to satisfy $\theta<45°$.

13. The magnetic encoder device according to claim 12, wherein the thickness-reduced portion comprises a chamfer.

14. The magnetic encoder device according to claim 12, wherein the thickness-reduced portion comprises a chamfer and a flat surface adjacent to the chamfer.

15. The magnetic encoder device according to claim 3, wherein a material containing a thermoplastic resin and a magnetic powder as main components is used as a material of the molded portion.

16. The magnetic encoder device according to claim 1, wherein the magnetic encoder track comprises a first track and a second track, each comprising magnetic poles.

17. A rotation detection device, comprising:
   the magnetic encoder device of claim 1;
   a rotary shaft; and
   a magnetic sensor opposed to the magnetic encoder track.

18. A method for producing a magnetic encoder device comprising: a rotary member; and a magnetic encoder track formed on the rotary member, the rotary member comprising a base portion made of sintered metal having a first surface and a supporting member fitted and fixed over the base portion, and the magnetic encoder track comprising a plurality of magnetic poles arranged in a circumferential direction of the rotary member, each of the plurality of magnetic poles of the magnetic encoder track being movable in a region opposed to a magnetic sensor to detect an angle of rotation of a rotary shaft, wherein:
   the rotary member has the first surface for mounting the rotary member to the rotary shaft, and a second surface for positioning the rotary member during formation of the magnetic encoder track by magnetization, the method comprising:
   forming the first surface and the second surface of the rotary member of a sintered metal, the sintered metal having a large number of micropores;
   sizing at least the first surface and the second surface of the sintered metal;
   forming the magnetic encoder track on the supporting member; and
   magnetizing the magnetic encoder track under a state in which the supporting member is fixed to the base portion.

* * * * *